(12) United States Patent
Nishio

(10) Patent No.: US 12,554,309 B2
(45) Date of Patent: Feb. 17, 2026

(54) INFORMATION PROCESSING APPARATUS AND CONTROL METHOD BASED ON FACE ORIENTATION

(71) Applicant: Lenovo (Singapore) Pte. Ltd., Singapore (SG)

(72) Inventor: Masashi Nishio, Kanagawa (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 142 days.

(21) Appl. No.: 18/489,995

(22) Filed: Oct. 19, 2023

(65) Prior Publication Data

US 2024/0176409 A1 May 30, 2024

(30) Foreign Application Priority Data

Nov. 28, 2022 (JP) .................. 2022-189337

(51) Int. Cl.
*G06F 1/3234* (2019.01)
*G06F 1/16* (2006.01)
*G06F 1/3231* (2019.01)

(52) U.S. Cl.
CPC .......... *G06F 1/3234* (2013.01); *G06F 1/1616* (2013.01); *G06F 1/1677* (2013.01); *G06F 1/1681* (2013.01); *G06F 1/1686* (2013.01); *G06F 1/3231* (2013.01)

(58) Field of Classification Search
None
See application file for complete search history.

(56) References Cited

U.S. PATENT DOCUMENTS

| | | | | |
|---|---|---|---|---|
| 7,046,287 B2* | 5/2006 | Nishino | ............ | H04M 1/0218 348/E7.079 |
| 8,854,834 B2* | 10/2014 | O'Connor | ............ | G06F 1/1681 16/334 |
| 11,616,869 B2* | 3/2023 | Lee | ............ | H04M 1/72454 455/575.3 |
| 11,809,237 B2* | 11/2023 | Cui | ............ | G06F 1/1618 |
| 2018/0329672 A1* | 11/2018 | Sadak | ............ | G06F 1/1649 |
| 2024/0302867 A1* | 9/2024 | Wang | ............ | H04M 1/0214 |

FOREIGN PATENT DOCUMENTS

| | | |
|---|---|---|
| JP | 2016-148895 A | 8/2016 |
| JP | 2019-194762 A | 11/2019 |
| JP | 7036975 B1 | 3/2022 |

* cited by examiner

*Primary Examiner* — Raymond N Phan
(74) *Attorney, Agent, or Firm* — Osha Bergman Watanabe & Burton LLP

(57) ABSTRACT

An information processing apparatus includes: a first chassis; a second chassis; a hinge coupling the first chassis and the second chassis to bend in a direction facing a first surface of the first chassis and a second surface of the second chassis while the first surface and the second surface are open; a sensor detecting orientations of the first chassis and the second chassis; an imaging unit provided on either one of the first surface and the second surface; a first processor controlling the operating state of a system by executing a program of the system; a second processor detecting a face and an orientation of the face from an image captured by the imaging unit; and a third processor controlling the operating state of the system based on the detected orientations of the first chassis and the second chassis and the orientation of the face.

11 Claims, 11 Drawing Sheets

INFORMATION PROCESSING APPARATUS AND CONTROL METHOD BASED ON FACE ORIENTATION

CROSS-REFERENCE TO RELATED APPLICATIONS

This application claims priority to Japanese Patent Application No. 2022-189337 filed on Nov. 28, 2022, the contents of which are hereby incorporated herein by reference in their entirety.

BACKGROUND OF THE INVENTION

Field of the Invention

The present invention relates to an information processing apparatus and a control method.

Description of the Related Art

There is an apparatus which makes a transition to a usable operating state when a person approaches or to a standby state in which functions except some of the functions are stopped when the person leaves. For example, in Japanese Unexamined Patent Application Publication No. 2016-148895, there is disclosed a technique for detecting the intensity of infrared light using an infrared sensor to detect whether a person is approaching or a person has left in order to control the operating state of the apparatus.

In recent years, with the development of computer vision and the like, detection accuracy when detecting a face from an image has been getting higher. Therefore, face detection is beginning to be used instead of person detection using the infrared sensor. In the case of using face detection, the orientation of a face is detected, and when the face is facing sideways, power consumption is also reduced by decreasing display brightness or turning off the display.

However, usage forms upon using a PC are diversified. A laptop PC equipped with a foldable, flexible display may be used as a normal laptop PC by folding the display to some extent, or may be used to be held by a user in hand like a tablet PC in a flat state without folding the display. Further, the laptop PC may be used with the display in landscape orientation, or may be used with the display in portrait orientation. When the laptop PC is used with the display in landscape orientation, the laptop PC may be used as a so-called book mode by folding the display to some extent.

Here, it is common that a camera for capturing images for face detection is provided on any edge of a chassis on the display side to be able to image a side where the user is present. Therefore, when the usage forms upon using the PC are diversified as described above, the positional relationship between the camera and the face of the user relatively changes, and the user may be imaged to face sideways in the camera despite the fact that the user is facing forward. In such a case, there is concern that the apparatus is controlled to an unintended operating state such as to decrease the display brightness or turn off the display.

SUMMARY OF THE INVENTION

The present invention provides an information processing apparatus and a control method capable of preventing control to an unintended operating state when controlling the operating state using face detection.

An information processing apparatus according to the first aspect of the present invention includes: a first chassis; a second chassis; a hinge mechanism which couples the first chassis and the second chassis together to be bendable in a direction to face a first surface of the first chassis and a second surface of the second chassis from a state in which the first surface and the second surface are open; a sensor for detecting orientations of the first chassis and the second chassis; an imaging unit provided on either one of the first surface and the second surface to image a direction to face the surface on which the imaging unit is provided; a memory which temporarily stores a program of a system; a first processor which controls an operating state of the system by executing the program; a second processor which detects a face area with a face captured therein and an orientation of the face from an image captured by the imaging unit; and a third processor which detects the orientations of the first chassis and the second chassis using the sensor to instruct control of the operating state of the system to be controlled by the first processor based on the detected orientations of the first chassis and the second chassis, and the orientation of the face captured in the face area detected by the second processor.

The above information processing apparatus may be such that the third processor detects, as the orientations of the first chassis and the second chassis, a rotation angle in a direction of rotation about an axis orthogonal to the first surface or the second surface, and a hinge angle between the first chassis and the second chassis by the hinge mechanism, and when the rotation angle is in a predetermined angle range, the third processor instructs control of the operating state of the system to be controlled by the first processor based on the orientation of the face captured in the face area detected by the second processor, and the hinge angle.

The above information processing apparatus may also be such that when the rotation angle is in any angle range other than the predetermined angle range, the third processor instructs the control of the operating state of the system to be controlled by the first processor based on the orientation of the face captured in the face area detected by the second processor.

The above information processing apparatus may further be such that in a case where the rotation angle is in any angle range other than the predetermined angle range, when the orientation of the face captured in the face area detected by the second processor is changed from a first direction range determined to be a front direction to any direction range other than the first direction range, the third processor instructs the operating state of the system to make a transition to an operating state with reduced power consumption, and in a case where the rotation angle is in the predetermined angle range and the hinge angle is less than a predetermined angle, when the orientation of the face captured in the face area detected by the second processor is changed from a second direction range wider than the first direction range to any direction range other than the second direction range, the third processor instructs the operating state of the system to make the transition to the operating state with reduced power consumption.

Further, the above information processing apparatus may be such that when the rotation angle is in any angle range other than the predetermined angle range, the third processor instructs control of the operating state of the system to be controlled by the first processor based on angle information corresponding to the orientation of the face captured in the face area detected by the second processor, and when the rotation angle is in the predetermined angle range and the hinge angle is less than a predetermined angle, the third processor corrects, based on the hinge angle, angle information corresponding to the orientation of the face captured in the face area detected by the second processor, and based on the corrected angle information, the third processor instructs control of the operating state of the system to be controlled by the first processor.

Further, the above information processing apparatus may be such that the case where the rotation angle is in the predetermined angle range includes a state where the first chassis and the second chassis are located in a horizontal direction across the hinge mechanism.

The above information processing apparatus may further include a display provided from the first surface to the second surface to be bendable according to bending by the hinge mechanism.

An information processing apparatus according to the second aspect of the present invention includes: a first chassis; a second chassis; a hinge mechanism which couples the first chassis and the second chassis together to be bendable in a direction to face a first surface of the first chassis and a second surface of the second chassis from a state in which the first surface and the second surface are open; a sensor for detecting orientations of the first chassis and the second chassis; an imaging unit provided on either one of the first surface and the second surface to image a direction to face the surface on which the imaging unit is provided; a memory which temporarily stores a program of a system; a first processor which controls an operating state of the system by executing the program; a second processor which detects a face area with a face captured therein and an orientation of the face from an image captured by the imaging unit; and a third processor which instructs control of the operating state of the system to be controlled by the first processor based on angle information corresponding to the orientation of the face captured in the face area detected by the second processor, wherein the third processor detects the orientations of the first chassis and the second chassis using the sensor, and based on the detected orientations of the first chassis and the second chassis, the third processor corrects angle information corresponding to the orientation of the face captured in the face area detected by the second processor.

The above information processing apparatus may be such that the third processor detects, as the orientations of the first chassis and the second chassis, a rotation angle in a direction of rotation about an axis orthogonal to the first surface or the second surface, and a hinge angle between the first chassis and the second chassis by the hinge mechanism, and when the rotation angle is in a predetermined angle range, the third processor corrects, based on the hinge angle, angle information corresponding to the orientation of the face captured in the face area detected by the second processor.

A control method according to the third aspect of the present invention is a control method for an information processing apparatus including: a first chassis; a second chassis; a hinge mechanism which couples the first chassis and the second chassis together to be bendable in a direction to face a first surface of the first chassis and a second surface of the second chassis from a state in which the first surface and the second surface are open; a sensor for detecting orientations of the first chassis and the second chassis; an imaging unit provided on either one of the first surface and the second surface to image a direction to face the surface on which the imaging unit is provided; a memory which temporarily stores a program of a system; a first processor which controls an operating state of the system by executing the program; a second processor; and a third processor, the control method including: a step of causing the second processor to detect a face area with a face captured therein and an orientation of the face from an image captured by the imaging unit; a step of causing the third processor to detect the orientations of the first chassis and the second chassis using the sensor; and a step of causing the third processor to instruct control of the operating state of the system to be controlled by the first processor based on the detected orientations of the first chassis and the second chassis, and the orientation of the face captured in the face area detected by the second processor.

A control method according to the fourth aspect of the present invention is a control method for an information processing apparatus including: a first chassis; a second chassis; a hinge mechanism which couples the first chassis and the second chassis together to be bendable in a direction to face a first surface of the first chassis and a second surface of the second chassis from a state in which the first surface and the second surface are open; a sensor for detecting orientations of the first chassis and the second chassis; an imaging unit provided on either one of the first surface and the second surface to image a direction to face the surface on which the imaging unit is provided; a memory which temporarily stores a program of a system; a first processor which controls an operating state of the system by executing the program; a second processor; and a third processor, the control method including: a step of causing the second processor to detect a face area with a face captured therein and an orientation of the face from an image captured by the imaging unit; a step of causing the third processor to detect the orientations of the first chassis and the second chassis using the sensor, and to correct, based on the detected orientations of the first chassis and the second chassis, angle information corresponding to the orientation of the face captured in the face area detected by the second processor; and a step of causing the third processor to instruct control of the operating state of the system to be controlled by the first processor based on the corrected angle information.

The above-described aspects of the present invention can prevent control to an unintended operating state when the information processing apparatus controls the operating state using face detection.

DETAILED DESCRIPTION OF THE INVENTION

Embodiments of the present invention will be described below with reference to the accompanying drawings.

First Embodiment

First, a first embodiment of the present invention will be described.

Figure 1:
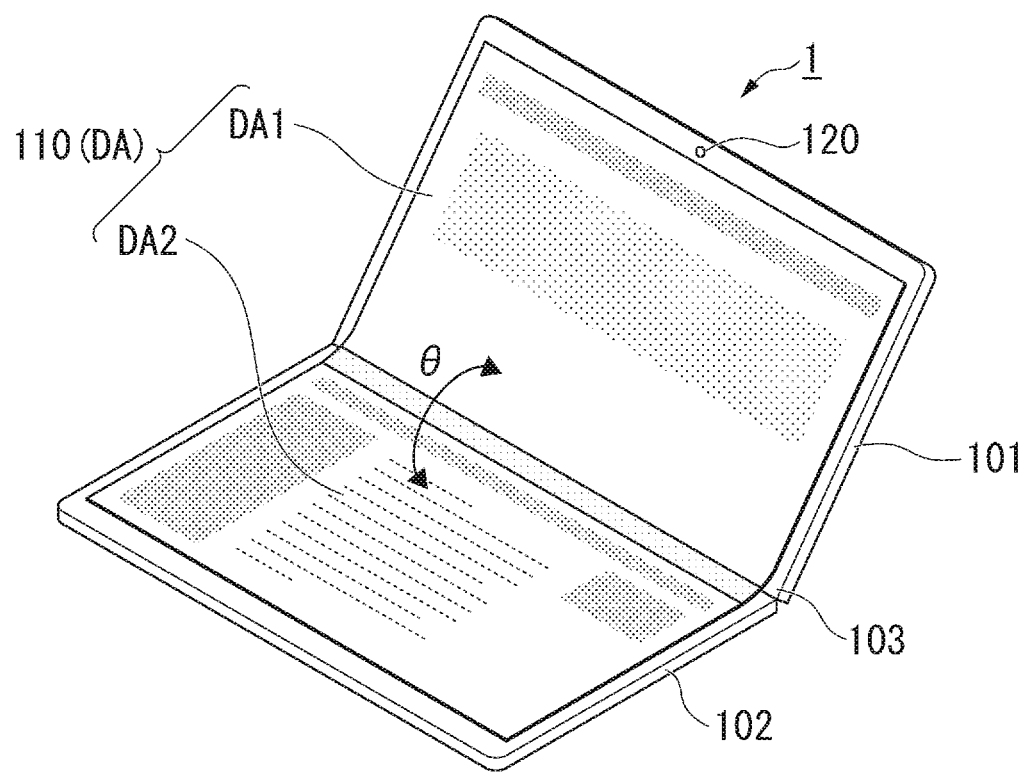
FIG. 1 is a perspective view illustrating a configuration example of the appearance of an information processing apparatus according to a first embodiment.

FIG. 1 is a perspective view illustrating the appearance of an information processing apparatus 1 according to the present embodiment. The information processing apparatus 1 according to the present embodiment is, for example, a laptop PC (Personal Computer) equipped with a foldable display. The information processing apparatus 1 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the rotation axis of the hinge mechanism 103.

A state where a hinge angle θ between the first chassis 101 and the second chassis 102 around the rotation axis is substantially 0° is a state where the first chassis 101 and the second chassis 102 are closed to overlap each other (closed state). Surfaces of the first chassis 101 and the second chassis 102 on the sides to face each other in the closed state are called "inner surfaces," and surfaces on the other sides of the inner surfaces are called "outer surfaces," respectively. The hinge angle θ can also be called an angle between the inner surface of the first chassis 101 and the inner surface of the second chassis 102.

As opposed to the closed state, a state where the inner surface of the first chassis 101 and the inner surface of the second chassis 102 are open is called an "open state." The open state is a state where the first chassis 101 and the second chassis 102 are rotated relative to each other until the hinge angle θ exceeds a preset threshold value (for example, 10°). The inner surface of the first chassis 101 and the inner surface of the second chassis 102 are flattened out (flat state) when the hinge angle θ is 180°. The information processing apparatus 1 is bendable by the rotation of the hinge mechanism 103 in a direction to face the inner surface of the first chassis 101 and the inner surface of the second chassis 102 from the open state, and the information processing apparatus 1 is put in the closed state by being bent until the hinge angle θ becomes substantially 0°. The example illustrated in FIG. 1 corresponds to a typical usage form of a so-called clamshell PC in a state where the hinge angle θ is about 70° to 135°.

Further, the information processing apparatus 1 includes a display 110 (display unit) and an imaging unit 120. The display 110 is provided from the inner surface of the first chassis 101 to the inner surface of the second chassis 102. The display 110 is a flexible display bendable (foldable) to fit the hinge angle θ by relative rotation of the first chassis 101 and the second chassis 102. As the flexible display, an organic EL display or the like is used.

The information processing apparatus 1 can control not only display as a one-screen structure in which the entire screen area of the display 110 is used as one screen area DA, but also display as a two-screen structure in which the entire screen area of the display 110 is split into two screen areas of a first screen area DA1 and a second screen area DA2. Here, since the first screen area DA1 and the second screen area DA2 are screen areas as a result of splitting the screen area DA of the display 110, these are screen areas that do not overlap each other. Here, it is assumed that a screen area corresponding to the inner surface side of the first chassis 101 between the screen areas of the display 110 is the first screen area DA1, and a screen area corresponding to the inner surface side of the second chassis 102 is the second screen area DA2. In the following, a display mode to control the display in the one-screen structure is called a "one-screen mode," and a display mode to control the display in the two-screen structure is called a "two-screen mode."

Further, for example, the display 110 is configured together with a touch panel to accept user's operations on the display screen of the display 110. A user can view the display of the display 110 provided on the respective inner surfaces of the first chassis 101 and the second chassis 102 and perform touch operations on the display 110 by putting the information processing apparatus 1 into the open state, thus enabling the use of the information processing apparatus 1.

The imaging unit 120 is provided outside (in a peripheral area) of the screen area DA of the display 110 on the inner surface of the first chassis 101. For example, the imaging unit 120 is placed on the first chassis 101 near the center of a side opposite to the side of the first chassis 101 joined (coupled) to the second chassis 102 through the hinge mechanism 103.

This position at which the imaging unit 120 is placed corresponds to the "12 o'clock position" of an analog clock by replacing the center position of the information processing apparatus 1 with the center position of the analog clock when the user views the information processing apparatus 1 illustrated in FIG. 1, which is referred to as an "upper-side position" below. The "6 o'clock position" opposite to this upper-side position is referred to as the "lower-side position," the "9 o'clock position" is referred to as the "left-side position," and the "3 o'clock position" is referred to as the "right-side position."

In the open state, the imaging unit 120 images a predetermined imaging range in a direction (frontward) to face the display 110. The predetermined imaging range is a range of angles of view defined by an image sensor included in the imaging unit 120 and an optical lens provided in front of an imaging surface of the image sensor. For example, the imaging unit 120 can capture an image including a person present in front of the information processing apparatus 1.

Note that the example in which the position of the imaging unit 120 is an upper position on the inner surface of the first chassis 101 is illustrated in FIG. 1, but this position is just an example, and the imaging unit 120 may also be placed at any other position capable of capturing an image in the direction (frontward) to face the display 110. For example, on the inner surface of the first chassis 101, the imaging unit 120 may be placed at a lower position, or may be placed at a right or left position. Further, the imaging unit 120 may be placed on the inner surface of the second chassis 102.

Usage forms of the information processing apparatus 1 are classified into a state in which the first chassis 101 and the second chassis 102 are bent at the hinge angle θ between the first chassis 101 and the second chassis 102 (Bent form), and a flat state in which the first chassis 101 and the second chassis 102 are not bent (Flat form). In the following, the state where the first chassis 101 and the second chassis 102 are bent (Bent form) is simply called the "bent state (Bent form)," and the flat state where the first chassis 101 and the second chassis 102 are not bent (Flat form) is simply called the "flat state (Flat form)." In the bent state (Bent form), the display 110 provided over the first chassis 101 and the second chassis 102 is also in the bent state. In the flat state (Flat form), the display 110 is also in the flat state.

Figure 2:
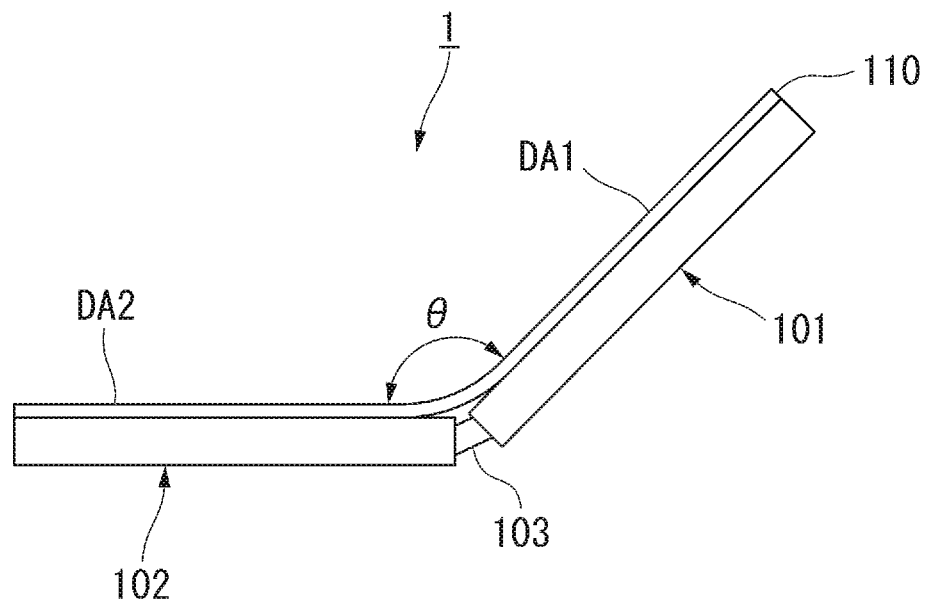
FIG. 2 is a side view illustrating an example of the information processing apparatus in a bent state according to the first embodiment.

FIG. 2 is a side view illustrating an example of the information processing apparatus 1 in the bent state (Bent form). The display 110 is placed over (across) the first chassis 101 and the second chassis 102. The screen area of the display 110 (the screen area DA illustrated in FIG. 1) can be bent by using a part corresponding to the hinge mechanism 103 as a crease, and on the border of this crease, a screen area on the side of the first chassis 101 is illustrated as the first screen area DA1, and a screen area on the side of the second chassis 102 is illustrated as the second screen area DA2. The display 110 is bent according to the rotation (hinge angle θ) between the first chassis 101 and the second chassis 102. The information processing apparatus 1 determines whether or not the state is the bent state (Bent form) according to the hinge angle θ. As an example, in the case of 10°<θ<170°, the information processing apparatus 1 determines that the state is the bent state (Bent form). This state corresponds to a usage form as a so-called clamshell mode or a book mode.

Figure 3:
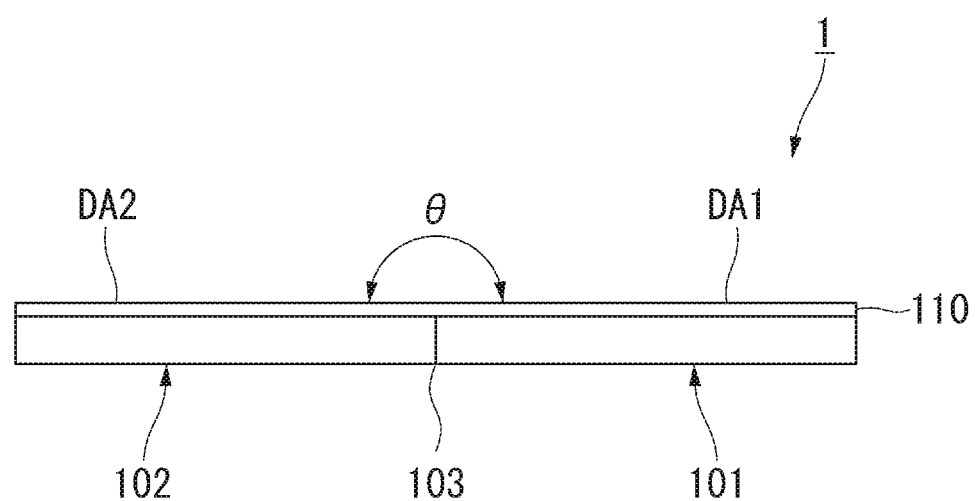
FIG. 3 is a side view illustrating an example of the information processing apparatus in a flat state according to the first embodiment.

FIG. 3 is a side view illustrating an example of the information processing device 1 in the flat state (Flat form). The information processing apparatus 1 typically determines that the state is the flat state (Flat form) when the hinge angle θ is 180°, but as an example, the information processing apparatus 1 may also determine that the state is the flat state (Flat form) when the hinge angle θ is in a range of 170°≤θ≤180°. For example, when the hinge angle θ between the first chassis 101 and the second chassis 102 is 180°, the display 110 is also in the flat state. This state corresponds to a usage form as a so-called tablet mode.

[Outline of HPD Processing]

Based on an image captured by the imaging unit 120, the information processing apparatus 1 detects a person (that is, a user) present in the neighborhood of the information processing apparatus 1. This processing for detecting the presence of the person is called HPD (Human presence Detection) processing. The information processing apparatus 1 detects the presence or absence of a person by the HPD processing to control the operating state of the system of the information processing apparatus 1 based on the detection result.

The information processing apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is an operating state in which at least some of functions of the system are limited. For example, the standby state may be the standby state or a sleep state, a state corresponding to modern standby in Windows (registered trademark), or S3 state (sleep state) defined in the ACPI specification. Further, a state in which at least the display of the display unit appears to be OFF (screen OFF) or a screen lock state may be included as the standby state. The screen lock is a state in which an image preset to make a content being processed invisible (for example, an image for the screen lock) is displayed on the display 110, that is, an unusable state until the lock is released (for example, until the user is authenticated).

In the following, a transition of the system operating state from the standby state to the normal operating state may also be called "boot." In the standby state, since the activation level is generally lower than that in the normal operating state, the boot of the system of the information processing apparatus 1 leads to the activation of the operation of the system in the information processing apparatus 1.

Figure 4A:
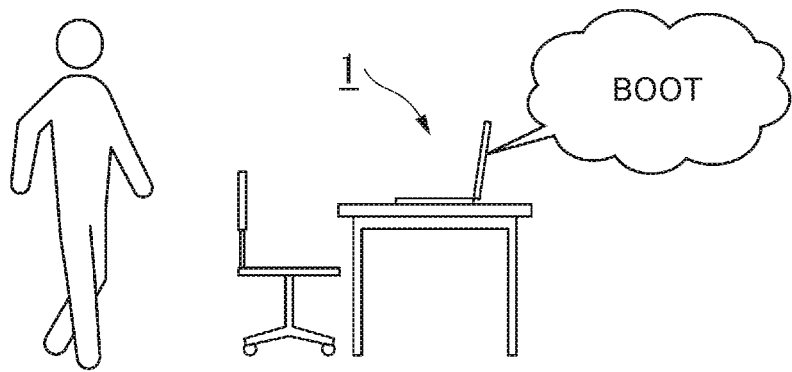
FIGS. 4A-4C are diagrams for describing an outline of HPD processing of the information processing apparatus according to the first embodiment.
Figure 4B:
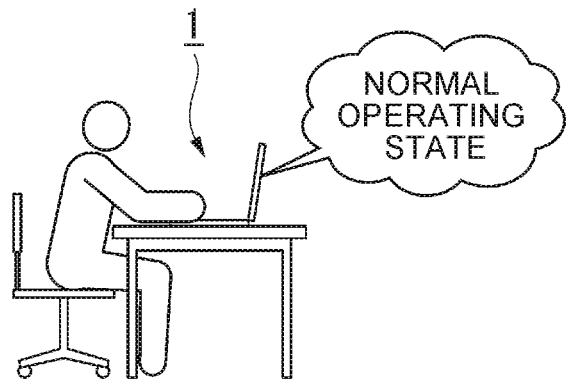
Figure 4C:
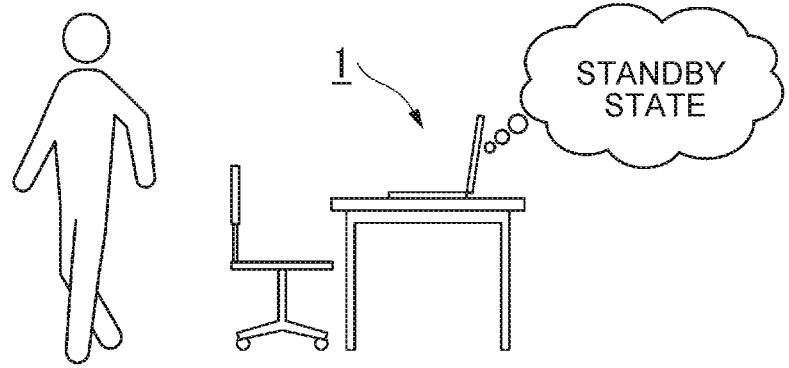

FIGS. 4A-4C are diagrams for describing an outline of HPD processing of the information processing apparatus 1 according to the present embodiment. For example, as illustrated in FIG. 4A, when detecting a change from a state where no person is present in front of the information processing apparatus 1 (absence) to a state where a person is present (presence), that is, when detecting that a person approaches the information processing apparatus 1 (Approach), the information processing apparatus 1 determines that a user has approached and automatically boots the system to make a transition to the normal operating state. Further, in a state where a person is present in front of the information processing apparatus 1 (presence) as illustrated in FIG. 4B, the information processing apparatus 1 determines that the user is present and continues the normal operating state. Then, as illustrated in FIG. 4C, when detecting a change from the state where the person is present in front of the information processing apparatus 1 (presence) to the state where no person is present (absence), that is, when detecting that the person has left the information processing apparatus 1 (Leave), the information processing apparatus 1 determines that the user has left and causes the system to make a transition to the standby state.

Figure 5:
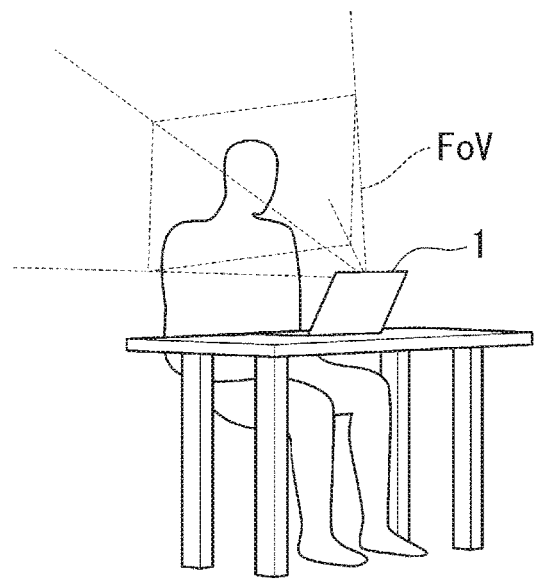
FIG. 5 is a diagram illustrating an example of a person detection range of the information processing apparatus according to the first embodiment.

FIG. 5 is a diagram illustrating an example of a person detection range of the information processing apparatus 1 according to the present embodiment. In the illustrated example, a detection range FoV (Field of View: detection viewing angle) in front of the information processing apparatus 1 is a person-detectable range. For example, the information processing apparatus 1 detects an image area with a face captured therein (hereinafter called a "face area") from a captured image obtained by the imaging unit 120 imaging forward to determine whether or not a person (user) is present in front of the information processing apparatus 1. The detection range FoV corresponds to an angle of view at which the imaging unit 120 captures an image. Based on the fact that the face area is detected from the captured image, the information processing apparatus 1 determines that the user is present. On the other hand, based on the fact that no face area is detected from the captured image, the information processing apparatus 1 determines that the user is not present.

When the face area is detected from the captured image, the information processing apparatus 1 further detects the orientation of the face in addition to the face area. The orientation of the face here is an orientation corresponding to the rotation angle of the face in the left-right direction such as whether the face is facing forward or sideways. For example, the information processing apparatus 1 detects whether the person (user) present in front is facing forward or facing sideways.

Figure 6:
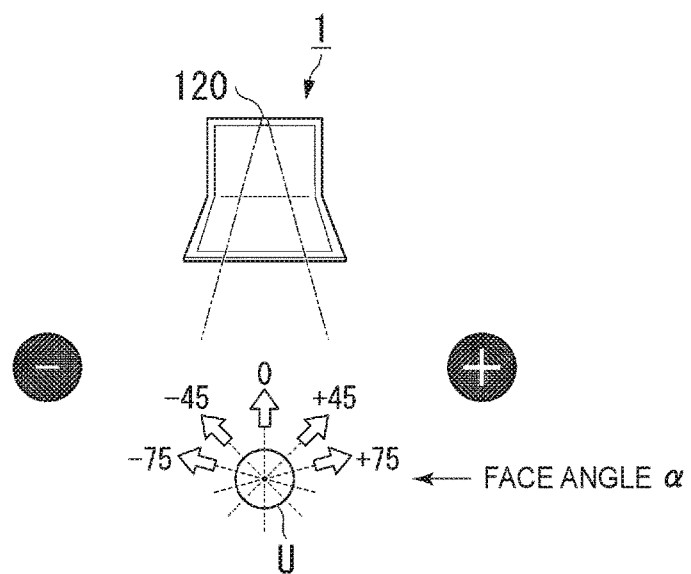
FIG. 6 is a diagram illustrating detection examples of the orientation of a face in the information processing apparatus according to the first embodiment.

FIG. 6 is a diagram illustrating detection examples of the orientation of a face in the information processing apparatus 1 according to the present embodiment. In this figure, the orientations of a face of user U are indicated by arrows when viewed from above. In the following, each of rotation angles (orientations) of the face to left and right is called a "face angle α." When the user U is facing the direction of the information processing apparatus 1 is the time when the user U is facing forward, which is face angle α="0°" here. For example, the information processing apparatus 1 detects face angles α in three stages of "0°," "45°," and "75°." Specifically, the information processing apparatus 1 detects face angle α="0°," face angles α of "+45°" and "+75°" as orientations of the face in + direction (right direction), and face angles α of "−45°" and "−75°" as orientations of the face in − direction (left direction).

Here, in the case where the system is in the normal operating state, when the orientation of the face of the user U is forward, the information processing apparatus 1 continues the normal operating state. On the other hand, when the face of the user U is turned sideways, since the user U does not look at the information processing apparatus 1, the information processing apparatus 1 makes a transition to an operating state with power consumption reduced by reducing the display brightness of the display 110 (hereinafter called a "low power state"). For example, as illustrated in FIG. 6, when the face angle α is "0," the information processing apparatus 1 performs control to the normal operating state, while when the face angle α is any of "+45°," "−45°," "+75°," and "−75°," the information processing apparatus 1 performs control to the low power state.

Note that the low power state is an operating state with power consumption lower than that of the normal operating state, which may be a state in which the display brightness of the display 110 is reduced as mentioned above, but the present invention is not limited thereto. For example, the low power state may also be a state in which the display of the display 110 appears to be OFF (screen OFF). Further, the low power state may be the standby state such as the standby state or the sleep state.

Examples of Usage Forms

Figure 7:
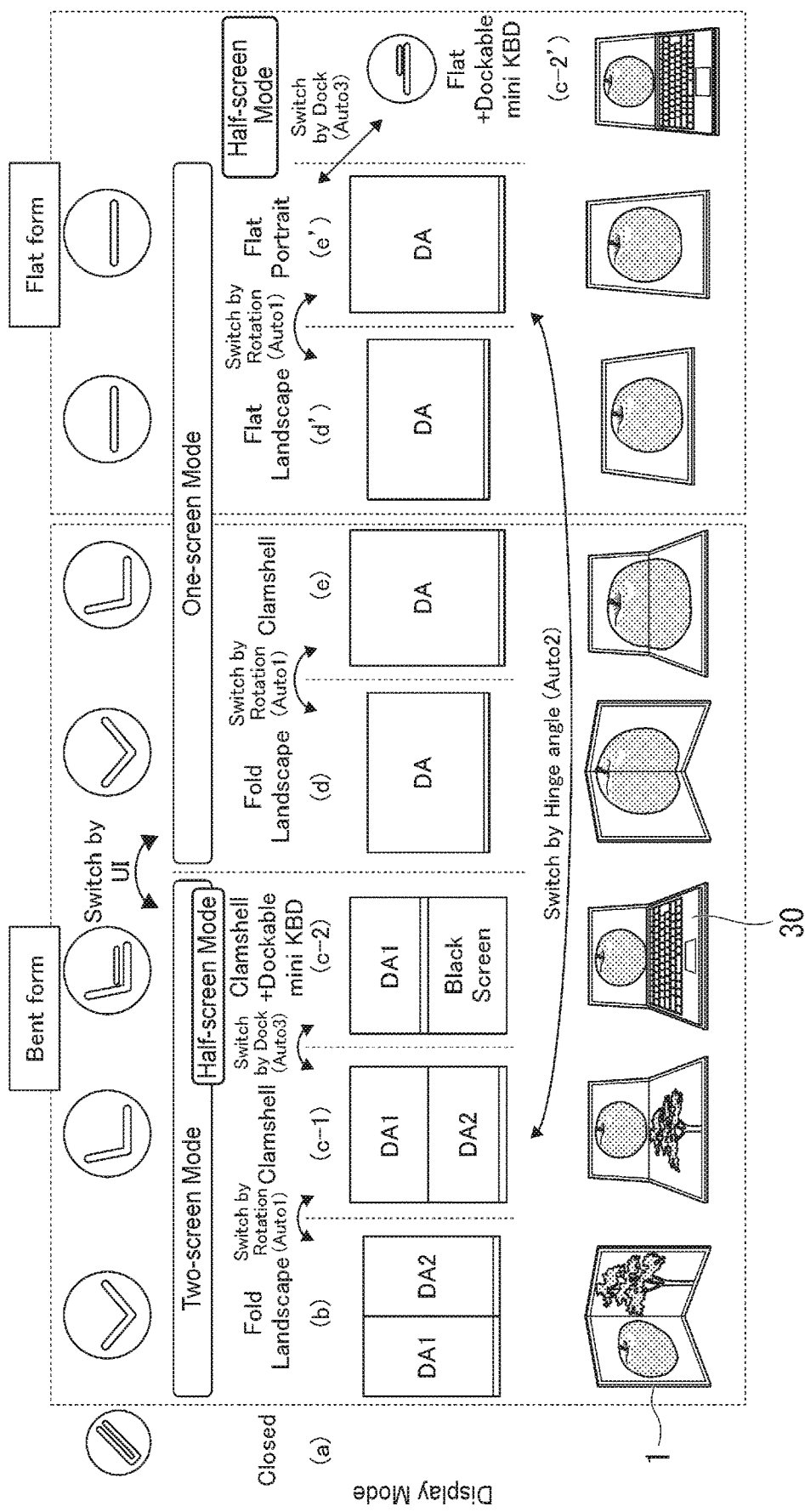
FIG. 7 is a diagram illustrating specific examples of display modes in various usage forms of the information processing apparatus according to the first embodiment.

Referring here to FIG. 7, various usage forms of the information processing apparatus 1 will be described.

FIG. 7 is a diagram illustrating specific examples of display modes in various usage forms of the information processing apparatus 1 according to the present embodiment. The display mode of the information processing apparatus 1 is changed depending on the usage form. For example, the display mode of the information processing apparatus 1 varies depending on the usage form classified by the posture of the information processing apparatus 1 determined by the orientation and the hinge angle θ of the information processing apparatus 1, whether the display mode is the one-screen or the two-screen mode, and the like. Note that one screen is also called a single screen or a full screen, and two screens are also called spilt screens or dual screens.

Display mode (a) is a display mode when the first chassis 101 and the second chassis 102 are in the closed state (Closed) as the usage form. For example, in this closed state, the information processing apparatus 1 is in the standby state such as the sleep state or a hibernation state, and the display 110 is in a display-off state. This standby state such as the sleep state or the hibernation state corresponds, for example, to S3 or S4 as system power status defined in the ACPI (Advanced Configuration and Power Interface) specification.

Display mode (b) is a display mode in the bent state (Bent form) as the usage form and in the two-screen mode in which the display is controlled by splitting the screen area of the display 110 into the two screen areas of the first screen area DA1 and the second screen area DA2. Further, the orientation of the information processing apparatus 1 is an orientation in which the first screen area DA1 and the second screen area DA2 are lined up side by side in portrait orientation. The portrait orientation of the screen areas means an orientation in which long sides of the four sides of each of rectangular screen areas are vertical and short sides are horizontal. When the display areas are in portrait orientation, the display orientation is also portrait, that is, the display is provided in such an orientation that the direction along the long sides corresponds to the up-down direction and the direction along the short sides corresponds to the left-right direction. This usage form is a usage form in which left and right screens correspond to left and right pages when the user holds a book in hand and opens the book, which corresponds to the so-called book mode. Since this usage form is in the bent state (Bent form) and the screen area of two combined screen areas of the first screen area DA1 and the second screen area DA2 lined up side by side is horizontally long, it is also called "Fold Landscape."

Like the display mode (b), display mode (c-1) is a display mode in the bent state (Bent form) and in the two-screen mode in which the display is controlled by splitting the screen area of the display 110 into the two screen areas of the first screen area DA1 and the second screen area DA2, but the display mode (c-1) is a usage form different from the display mode (b) in terms of the orientation of the information processing apparatus 1. The orientation of the information processing apparatus 1 is an orientation in which the first screen area DA1 and the second screen area DA2 are vertically lined up and down in landscape orientation. The landscape orientation of the screen areas means an orientation in which long sides of the four sides of each of the rectangular screen areas are horizontal and short sides are vertical. When the screen areas are in landscape orientation, the display orientation is also landscape, that is, the display is provided in such an orientation that the direction along the short sides corresponds to the up-down direction and the direction along the long sides corresponds to the left-right direction. This usage form is one of typical usage forms of a clamshell PC as illustrated in FIG. 1.

For example, the information processing apparatus 1 detects a change in the posture (orientation) of the information processing apparatus 1 to automatically switch from the display mode (b) to the display mode (c-1) or from the display mode (c-1) to the display mode (b) (Switch by Rotation). For example, since the display mode (c-1) is in such a state that the display 110 is rotated 90 degrees in the right direction from the state of the display mode (b) in FIG. 7, the information processing apparatus 1 switches to the display mode (c-1) when detecting the rotation of a predetermined angle (for example, 45 degrees) or more in the right direction from the state of the display mode (b). Further, since the display mode (b) is in such a state that the display 110 is rotated 90 degrees in the left direction from the state of the display mode (c-1) in FIG. 7, the information processing apparatus 1 switches to the display mode (b) when detecting the rotation of a predetermined angle (for example, 45 degrees) or more in the left direction from the state of the display mode (c-1).

Like the display mode (c-1), display mode (c-2) is in the bent state (Bent form) with the same orientation of the information processing apparatus 1 but different in that an external keyboard 30 (Dockable mini KBD (KeyBoard)) mountable on the information processing apparatus 1 is placed in a predetermined position. This usage form is in such a state that a physical keyboard 30 is connected in a general usage form of the clamshell PC. For example, in the present embodiment, the size of the keyboard 30 is almost equivalent to the size of the second screen area DA2, and the keyboard 30 is configured to be mountable on the second screen area DA2. Note that the keyboard 30 may also be a keyboard that occupies an area smaller than that of the second screen area DA2. As an example, magnets are provided inside (at the edges) of the bottom of the keyboard 30, and when the keyboard 30 is mounted on the second screen area DA2, the magnets are attracted to bezel parts of the inner surface edges of the second chassis 102 and fixed. Thus, the usage form becomes a usage form similar to that of a conventional clamshell PC with a physical keyboard originally provided thereon. Further, the information processing apparatus 1 and the keyboard 30 are connected, for example, through Bluetooth (registered trademark). In this display mode (c-2), since the keyboard 30 makes the second screen area DA2 invisible, the information processing apparatus 1 controls the second screen area DA2 to black display or display off. In other words, this display mode (c-2) is a display mode in which only one screen area as a half-screen area of the screen areas of the display 110 is enabled to provide a display (hereinafter called a "half-screen mode"), that is, a one-screen mode in which only the first screen area DA1 is used. In other words, the half-screen mode is a display mode in which the display in part of the screen area (screen area DA) of the display 110 (that is, first screen area DA1) except the screen area (second screen area DA2) on which the keyboard 30 is mounted is controlled as a screen area.

For example, when detecting the connection with the external keyboard in the state of the display mode (c-1), the information processing apparatus 1 automatically switches from the display mode (c-1) to the display mode (c-2) (Switch by Dock).

Like the display mode (b), display mode (d) is in the bent state (Bent form) with the same orientation of the information processing apparatus 1 but different in that the display mode (d) is the one-screen mode in which the display of the entire screen area of the display 110 is controlled as one screen area DA. Although this usage form is different from the display mode (b) in that the display mode is the one-screen mode, since it is in the bent state (Bent form) and the screen area DA is horizontally long, this display mode is also called "Fold Landscape." The screen area DA is in landscape orientation and the display orientation is also landscape. Note that since the display mode (d) is the "Fold Landscape" like the display mode (b), the display mode (d) also corresponds to the so-called book mode.

Here, for example, switching between the one-screen mode and the two-screen mode in the bent state (Bent form) is performed with a user operation. For example, the information processing apparatus 1 displays an operator as a UI (User Interface) capable of switching between the one-screen mode and the two-screen mode somewhere on the screen to switch from the display mode (b) to the display mode (d) based on an operation to the operator (Switch by UI).

Like the display mode (c-1), display mode (e) is in the bent state (Bent form) with the same orientation of the information processing apparatus 1 but different in that the display mode (e) is the one-screen mode in which the display of the entire screen area of the display 110 is controlled as one screen area DA. This usage form is different from the display mode (c-1) in that the display mode (e) is the one-screen mode, but the display mode (e) corresponds to a usage form of the clamshell PC from the bent state (Bent form) and the orientation of the information processing apparatus 1. The screen area DA is in portrait orientation and the display orientation is also portrait.

For example, the information processing apparatus 1 detects a change in the posture (orientation) of the information processing apparatus 1 to automatically switch from the display mode (d) to the display mode (e), or from the display mode (e) to the display mode (d) (Switch by Rotation). For example, since the display mode (e) is in such a state that the display 110 is rotated 90 degrees in the right direction from the state of the display mode (d) in FIG. 7, the information processing apparatus 1 switches to the display mode (e) when detecting the rotation of a predetermined angle (for example, 45 degrees) or more in the right direction from the state of the display mode (d). Further, since the display mode (d) is in such a state that the display 110 is rotated 90 degrees in the left direction from the state of the display mode (e) in FIG. 7, the information processing apparatus 1 switches to the display mode (d) when detecting the rotation of a predetermined angle (for example, 45 degrees) or more in the left direction from the state of the display mode (e).

Like the display mode (d), display mode (d') is the one-screen mode and the orientation of the information processing apparatus 1 is such an orientation that the display area DA is horizontally long, but different in that the information processing apparatus 1 is in the flat state (Flat form). The flat state (Flat form) is a state in which the hinge angle θ between the first chassis 101 and the second chassis 102 is substantially 180°. This usage form corresponds to the so-called tablet mode described with reference to FIG. 3. Since this usage form is in the flat state (Flat form) and the screen area DA is horizontally long, it is also called "Flat Landscape." This display mode (d') is different from the display mode (d) only in the hinge angle θ between the first chassis 101 and the second chassis 102. Like in the display mode (d), the screen area DA in the display mode (d') is in landscape orientation and the display orientation is also landscape.

Like the display mode (e), display mode (e') is the one-screen mode and the orientation of the information processing apparatus 1 is such an orientation that the screen area DA is vertically long, but different in that the information processing apparatus 1 is in the flat state (Flat form). Since this usage form is in the flat state (Flat form) and the screen area DA is vertically long, it is also called "Flat Portrait." This display mode (e') is different from the display mode (e) only in the hinge angle θ between the first chassis 101 and the second chassis 102. Like in the display mode (e), the screen area DA in the display mode (e') is in portrait orientation and the display orientation is also portrait.

For example, the information processing apparatus 1 detects a change in the posture (orientation) of the information processing apparatus 1 to automatically switch from the display mode (d') to the display mode (e'), or from the display mode (e') to the display mode (d') (Switch by Rotation). For example, since the display mode (e') is in such a state that the display 110 is rotated 90 degrees in the right direction from the state of the display mode (d') in FIG. 7, the information processing apparatus 1 switches to the display mode (e') when detecting the rotation of a predetermined angle (for example, 45 degrees) or more in the right direction from the state of the display mode (d'). Further, since the display mode (d') is in such a state that the display 110 is rotated 90 degrees in the left direction from the state of the display mode (e') in FIG. 7, the information processing apparatus 1 switches to the display mode (d') when detecting the rotation of a predetermined angle (for example, 45 degrees) or more in the left direction from the state of the display mode (e').

Note that in the display mode (d') and the display mode (e'), it is also possible to switch to the two-screen mode while keeping the flat state (Flat form) by the user performing an operation on a display mode switching icon. For example, when switching to the two-screen mode from the state of the display mode (d'), the display state becomes similar to the display mode (b) in the flat state (Flat form). Further, when switching to the two-screen mode from the state of the display mode (e'), the display state becomes similar to the display mode (c-1) in the flat state (Flat form).

Further, when detecting the connection with the keyboard 30 in the state of the display mode (e'), the information processing apparatus 1 automatically switches from the display mode (e') to display mode (c-2') (Switch by Dock). The display mode (c-2') is in the flat state (Flat form) but different from the display mode (c-2) only in the hinge angle θ between the first chassis 101 and the second chassis 102. In this display mode (c-2'), since the second screen area DA2 becomes invisible by the keyboard 30, the information processing apparatus 1 controls the second screen area DA2 to black display or display off. In other words, like the display mode (c-2), this display mode (c-2') is the half-screen mode in which only one screen area as a half screen is enabled to provide a display in the screen area of the display 110.

Further, when detecting a change from the flat state (Flat form) to the bent state (Bent form), the information processing apparatus 1 can also switch from the one-screen mode to the two-screen mode. For example, when detecting a change to the bent state (Bent form) in the state of the display mode (d') based on the hinge angle θ between the first chassis 101 and the second chassis 102, the information processing apparatus 1 automatically switches from the display mode (d') to the display mode (b). Further, when detecting a change to the bent state (Bent form) in the state of the display mode (e') based on the hinge angle θ between the first chassis 101 and the second chassis 102, the information processing apparatus 1 automatically switches from the display mode (e') to the display mode (c-1).

Note that the usage form of "Flat Landscape" in the display mode (d') of FIG. 7 is simply called "landscape" below. Further, the usage form of "Fold Landscape" in the display mode (b) and the display mode (d) of FIG. 7 is called "book mode" below. In the landscape, the screen area DA of the display 110 is horizontally long, and the inner surface of the first chassis 101 and the inner surface of the second chassis 102 are located in the left-right direction (horizontal direction) across the hinge mechanism 103. In the present embodiment, it is assumed that the landscape is a usage form in which the left side is the first chassis 101 and the right side is the second chassis 102 across the hinge mechanism 103, and the imaging unit 120 is located on the left edge of the information processing apparatus 1 when viewed from the user.

Figure 8:
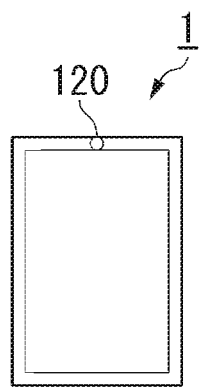
FIG. 8 is a diagram illustrating an example of a usage form determination method according to the first embodiment.
Figure 8:
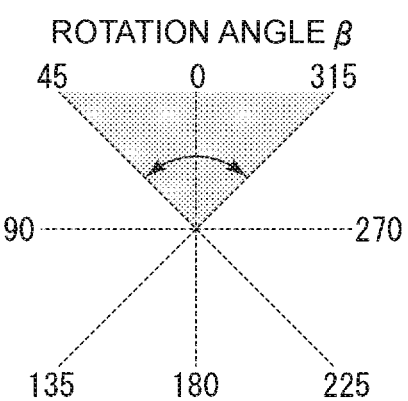
Figure 8:
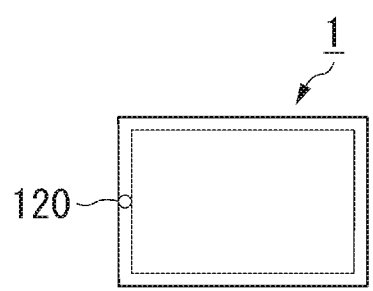
Figure 8:
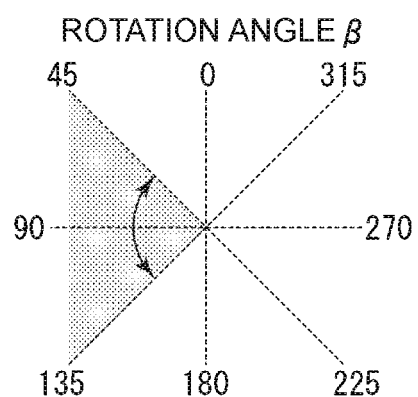

FIG. 8 is a diagram illustrating an example of a usage form determination method according to the present embodiment.

It can be determined whether or not the usage form is the landscape based, for example, on a rotation angle using an axis orthogonal to the display surface of the display 110 as the axis of rotation (hereinafter called "rotation angle β"). For example, when it is defined that the rotation angle β is 0° in the case where the imaging unit 120 is on the upper side and increases counterclockwise, the rotation angle β is 90° in the case where the imaging unit 120 is on the left side. The information processing apparatus 1 determines whether or not the usage form is the landscape, for example, by setting determination threshold values (for example, 45°, 135°, 225°, 315°) for the rotation angle β.

As an example, when the rotation angle β is "not less than 45° and not more than 135°," the information processing apparatus 1 determines that the usage form is the landscape. Note that when the usage form can be used as the landscape in the case where the imaging unit 120 is on the right side (rotation angle β=270°), the information processing apparatus 1 may determine that the usage form is the landscape when the rotation angle β is "not less than 225° and not more than 315°."

Further, when the rotation angle β is "less than 45° or 315° or more," the information processing apparatus 1 determines that the usage form is portrait (Flat Portrait). Note that the information processing apparatus 1 may also determine that the usage form is portrait (Flat Portrait) when the rotation angle β is "not less than 135° and not more than 225°". Note that hysteresis is set to the determination threshold values for the rotation angle β.

Figure 9:
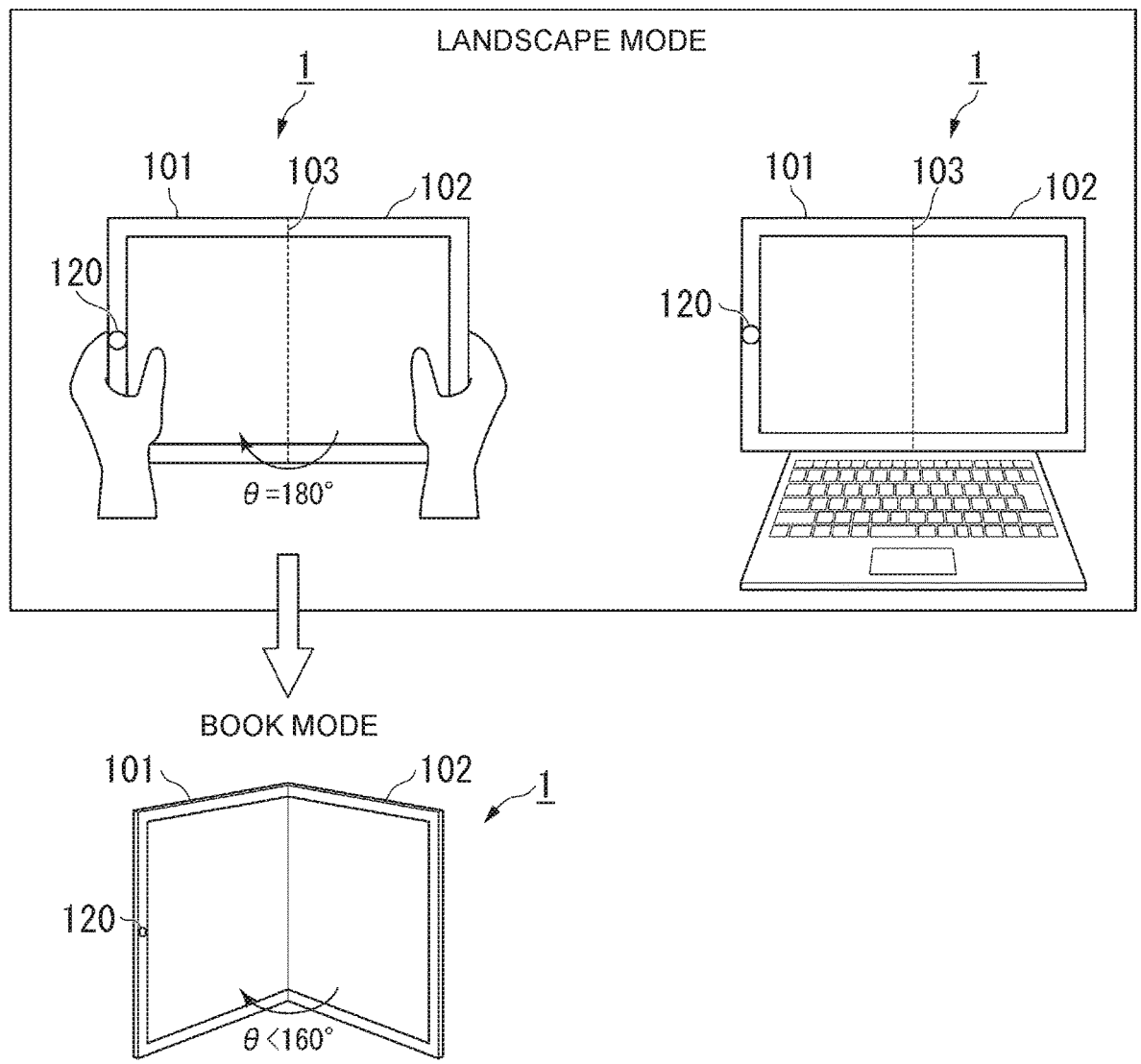
FIG. 9 is a diagram illustrating an example of a positional relationship of an imaging unit between a landscape mode and a book mode according to the first embodiment.

FIG. 9 is a diagram illustrating an example of a positional relationship of the imaging unit 120 between a landscape mode and a book mode according to the present embodiment. In the landscape mode, the imaging unit 120 is located on the left edge of the information processing apparatus 1 when viewed from the user. Therefore, when the first chassis 101 and the second chassis 102 are bent in a direction to make the inner surface of the first chassis 101 and the inner surface of the second chassis 102 face each other so as to be put into the book mode (for example, hinge angle θ<160°), the angle of imaging the user from the imaging unit 120 is changed to change the orientation of a face to be imaged.

Figure 10:
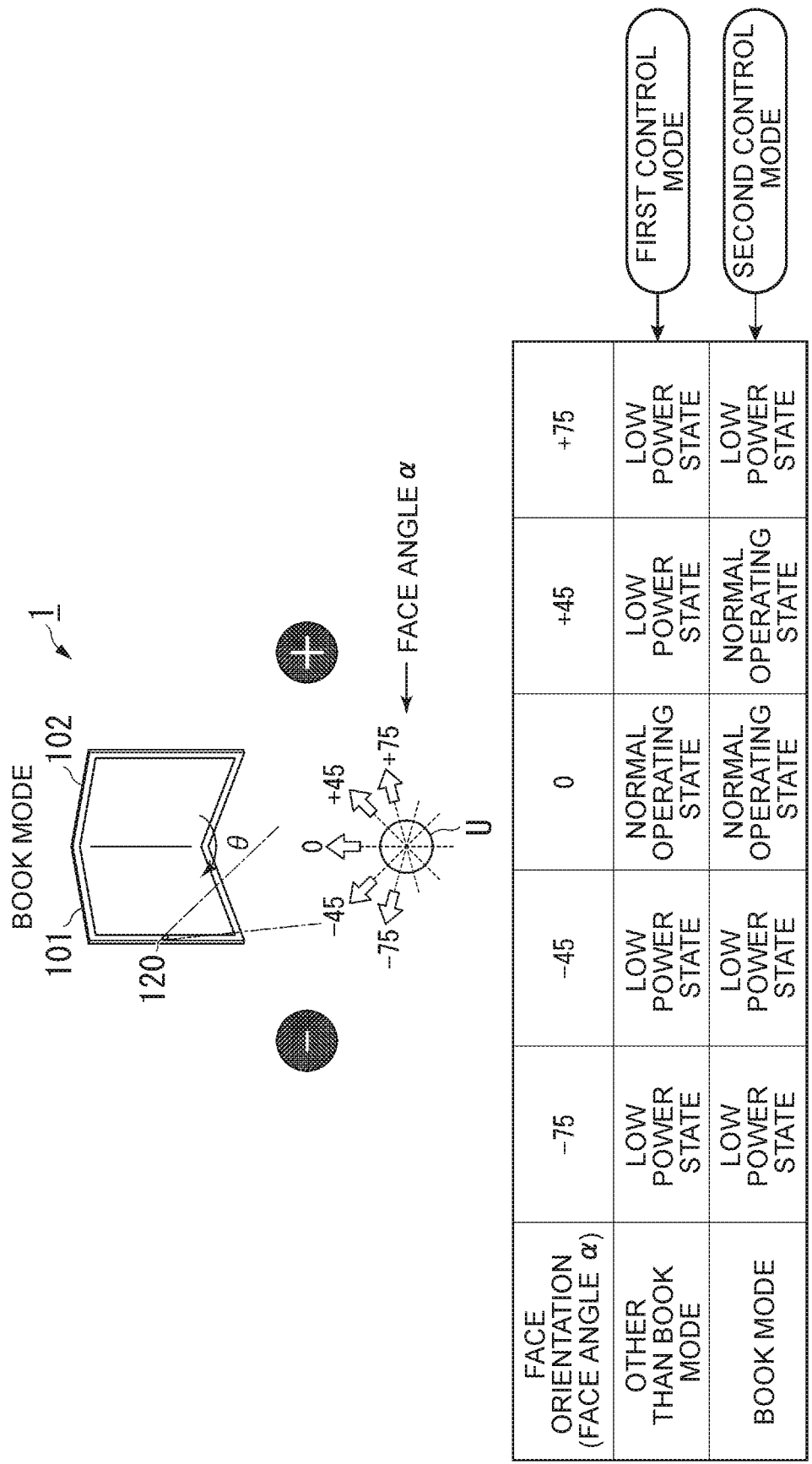
FIG. 10 is a diagram illustrating detection examples of the orientation of a face in the book mode according to the first embodiment.

FIG. 10 is a diagram illustrating detection examples of the orientation of a face in the book mode according to the present embodiment. In this figure, like in FIG. 6, orientations of a face of user U (face angles α) are indicated by arrows when viewed from above. The illustrated example is a case where the hinge angle θ is 130° in the book mode. In this case, since the angle of imaging the user U from the imaging unit 120 is changed, the face angle α is detected, for example, as face angle α="+45°," rather than face angle α="0," even when the user U is facing forward. In other words, in the case where the hinge angle θ is 180°, the imaging unit 120 can detect, as face angle α="0," a face facing forward when the user U is facing forward, but in the book mode, since the orientation of the face imaged by the imaging unit 120 deviates from the front even when the user U is facing forward, the detected face angle α also deviates from "0°," and the face angle α is detected, for example, as face angle α="+45°." When the information processing apparatus 1 makes a transition to the low power state by detecting that the face angle α of the user U is "+45°," it is unfavorable because the display brightness of the display 110 is reduced despite the fact that the user U is facing forward.

Therefore, in the book mode, when the face angle α is "0°" and "+45°," the information processing apparatus 1 performs control to the normal operating state, while when the face angle α is "−45°," "+75°," and "−75°," the information processing apparatus 1 performs control to the low power state. On the other hand, in usage forms other than the book mode, when the face angle α is "0°," the information processing apparatus 1 performs control to the normal operating state, while when the face angle α is "+45°," "−45°," "+75°," and "−75°," the information processing apparatus 1 performs control to the low power state like the control described with reference to FIG. 6. The usage forms other than the book mode are Portrait, Clamshell, Landscape (hinge angle θ=0°), and the like.

In the following, a control mode to perform control to the normal operating state when the face angle α is "0°" and to the low power state when the face angle α is "+45°," "−45°," "+75°," and "−75°" in the usage forms other than the book mode is called a "first control mode." On the other hand, a control mode to perform control to the normal operating state when the face angle α is "0°" and "+45°" and to the low power state when the face angle α is "−45°," "+75°," and "−75°" in the book mode is called a "second control mode."

Note that in the example of the book mode illustrated in FIG. 10, the imaging unit 120 is located on the left side of the information processing apparatus 1 when viewed from the user U. On the other hand, when the imaging unit 120 is located on the right side of the information processing apparatus 1 when viewed from the user U, the control mode to perform control to the normal operating state when the face angle α is "0°" and "−45°" and to the low power state when the face angle α is "+45°," "+75°," and "−75°" is the second control mode. The case of being located on the right side is, for example, a case where the imaging unit 120 is placed on the second chassis 102. Further, the case of being located on the right side may include a usable case where the information processing apparatus 1 illustrated in FIG. 10 is rotated upside down.

[Hardware Configuration of Information Processing Apparatus]

Figure 11:
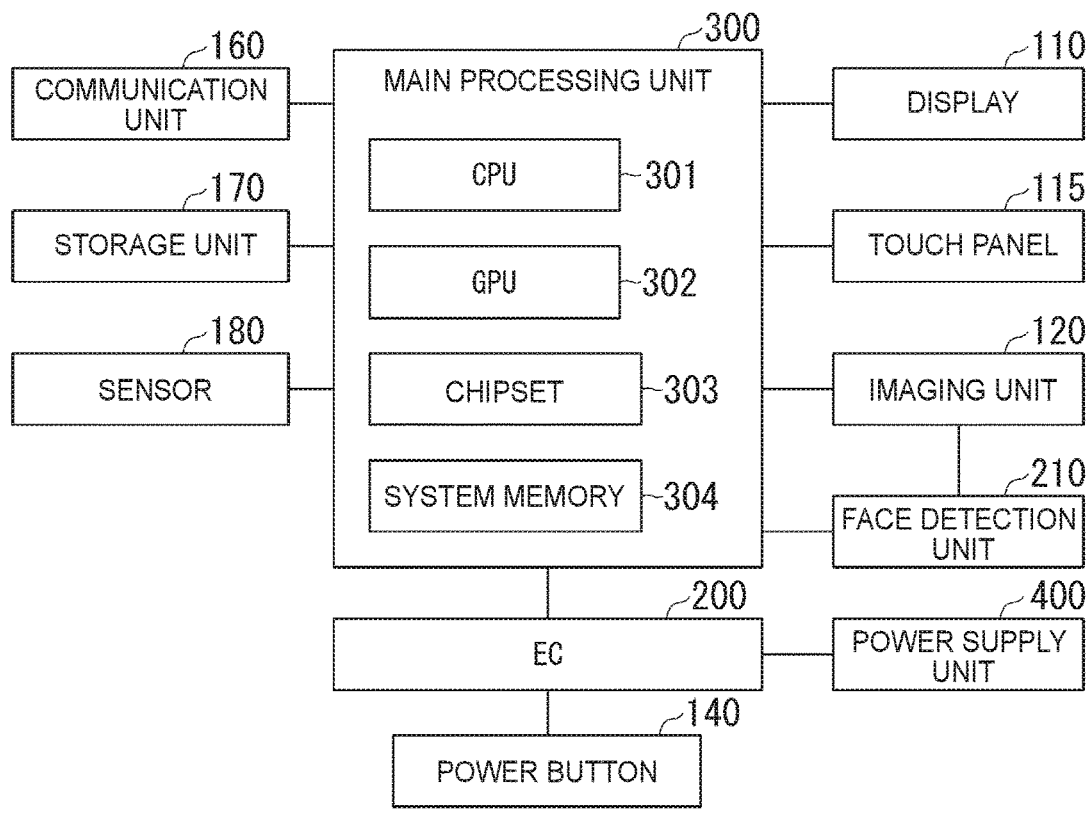
FIG. 11 is a schematic block diagram illustrating an example of the hardware configuration of the information processing apparatus according to the first embodiment.

FIG. 11 is a schematic block diagram illustrating an example of the hardware configuration of the information processing apparatus 1 according to the present embodiment. In FIG. 11, components corresponding to respective units in FIG. 1 are given the same reference numerals. The information processing apparatus 1 is configured to include the display 110, a touch panel 115, the imaging unit 120, a power button 140, a communication unit 160, a storage unit 170, a sensor 180, an EC (Embedded Controller) 200, a face detection unit 210, a main processing unit 300, and a power supply unit 400.

The display 110 displays display data (images) generated based on system processing executed by the main processing unit 300, processing of an application program running on the system processing, and the like. As described with reference to FIG. 1, the display 110 is, for example, the flexible display bendable (foldable) to fit the hinge angle θ by relative rotation of the first chassis 101 and the second chassis 102.

The touch panel 115 is provided on the display screen of the display 110 to output operation signals based on user's touch operations. For example, the touch panel 115 can be any touch panel such as capacitance-type or resistive-film type.

The imaging unit 120 captures an image of an object within the predetermined imaging range (angle of view) in the direction (frontward) to face the inner surface of the first chassis 101, and outputs the captured image to the main processing unit 300 and the face detection unit 210. For example, the imaging unit 120 is a visible light camera (RGB camera) to capture an image using visible light. Note that the imaging unit 120 may further include an infrared camera (IR camera) to capture an image using infrared light, or may be a hybrid camera capable of capturing images using visible light and infrared light. The power button 140 outputs, to the EC 200, an operation signal according to a user's operation.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SDD (Solid State Drive), a RAM, and a ROM. The storage unit 170 stores the OS, device drivers, various programs such as applications, and various data acquired by the operation of the programs.

The sensor 180 is a sensor for detecting the movement, orientation, and the like of the information processing apparatus 1, which is used to detect the posture (orientation), shaking, and the like of the information processing apparatus 1. For example, the sensor 180 is configured to include an acceleration sensor. Specifically, for example, the sensor 180 has two or more acceleration sensors provided in the first chassis 101 and the second chassis 102, respectively. The sensor 180 detects the respective movements, orientations, and the like of the first chassis 101 and the second chassis 102. Thus, based on the respective movements, orientations, and the like of the first chassis 101 and the second chassis 102, the hinge angle θ, the rotation angle β, and the like described above can be detected. Note that the sensor 180 may also be configured to include an angular velocity sensor, a tilt sensor, a geomagnetic sensor, or the like instead of or in addition to the acceleration sensors.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack) to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the function. The EC 200 operates independently of the main processing unit 300 to control the operation of the main processing unit 300 and manage the operating state of the main processing unit 300. Further, the EC 200 is connected to the power button 140, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1.

The face detection unit 210 is configured to include a processor for processing image data of a captured image captured by the imaging unit 120. The face detection unit 210 acquires the image data of the captured image captured by the imaging unit 120, and temporarily stores the acquired image data in a memory. The memory in which the image data is stored may be a system memory 304, or a memory connected to the above processor included in the face detection unit 210.

Further, the face detection unit 210 processes the image data of the captured image acquired from the imaging unit 120 to perform face detection processing for detecting a face area and the orientation of a face from the captured image. For example, based on the detection results by the face detection processing, the face detection unit 210 executes HPD processing to detect whether or not the user is present in front of the information processing apparatus 1. Further, when detecting in the HPD processing that the user is present in front, the face detection unit 210 outputs information indicative of the orientation of a face (face angle α) of the user. The details will be described later.

The main processing unit 300 is configured to include a CPU (Central Processing Unit) 301, a GPU (Graphic Processing Unit) 302, a chipset 303, and the system memory 304, where processing of various application programs is executable on the OS (Operating System) by system processing based on the OS.

The CPU 301 executes processing based on a BIOS program, processing based on the OS program, processing based on application programs running on the OS, and the like. The CPU 301 controls the operating state of the system under the control of the chipset 303. For example, the CPU 301 executes boot processing to cause the operating state of the system to make the transition from the standby state to the normal operating state. Further, the CPU 301 executes processing to cause the operating state of the system to make the transition from the normal operating state to the standby state.

The GPU 302 is connected to the display 110. The GPU 302 executes image processing under the control of the CPU 301 to generate display data. The GPU 302 outputs the generated display data to the display 110.

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the sensor 180, the display 110, and the EC 200.

Further, the chipset 303 has a function as a sensor hub. For example, the chipset 303 acquires output of the sensor 180 to detect the posture (orientation) of the information processing apparatus 1. For example, the posture (orientation) of the information processing apparatus 1 includes the hinge angle θ detected by the sensor 180 based on the orientations of the first chassis and the second chassis, the rotation angle β of the information processing apparatus 1 (the rotation angle β of the first chassis and the second chassis), and the like. Then, based on the detected posture of the information processing apparatus 1 and the results of the HPD processing by the face detection unit 210, the chipset 303 executes HPD control processing to instruct control of the operating state of the system. The details will be described later.

The system memory 304 is used as a reading area of a program executed by the CPU 301 and a working area to write processed data. Further, the system memory 304 temporarily stores image data of a captured image captured by the imaging unit 120.

Note that the CPU 301, the GPU 302, and the chipset 303 may also be integrated as one processor, or some or all of them may be configured as individual processors. For example, in the normal operating state, the CPU 301, the GPU 302, and the chipset 303 are all operating, but in the standby state, only at least part of the chipset 303 is operating. In the standby state, at least only functions required for HPD processing upon booting are operating.

[Functional Configuration of Information Processing Apparatus]

Next, a functional configuration in which the information processing apparatus 1 controls the operating state of the system by the HPD processing will be described.

Figure 12:
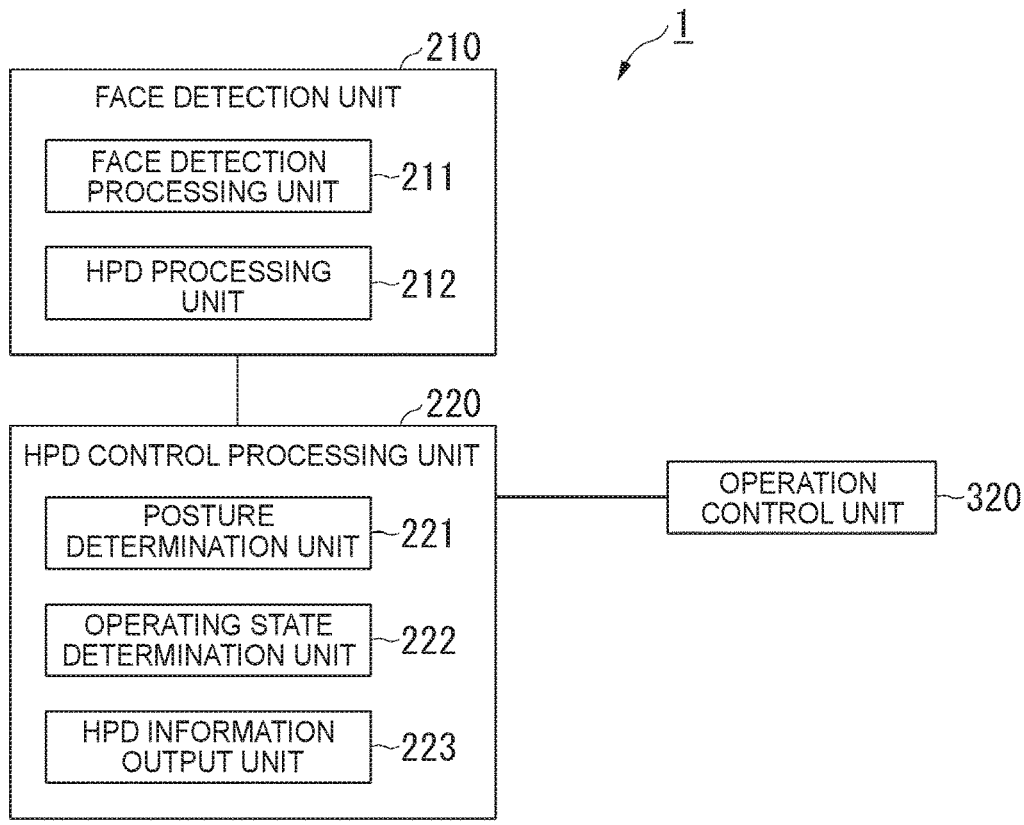
FIG. 12 is a schematic block diagram illustrating an example of the functional configuration of the information processing apparatus according to the first embodiment.

FIG. 12 is a block diagram illustrating an example of the functional configuration of the information processing apparatus 1 according to the present embodiment. The information processing apparatus 1 includes the face detection unit 210, an HPD control processing unit 220, and an operation control unit 320. The face detection unit 210 corresponds to the face detection unit 210 illustrated in FIG. 11. The HPD control processing unit 220 is a functional component implemented by the main processing unit 300 illustrated in FIG. 11 executing a control program, which is, for example, a functional component executed by the chipset 303. The operation control unit 320 is a functional component implemented by the main processing unit 300 illustrated in FIG. 11 executing the OS program, which is, for example, a functional component executed by the CPU 301.

The face detection unit 210 includes a face detection processing unit 211 and an HPD processing unit 212. The face detection processing unit 211 reads, from the system memory 304, image data of captured images captured by the imaging unit 120 at predetermined time intervals to perform image processing, image analysis, and the like on the respective captured images captured at the predetermined time intervals.

For example, the face detection processing unit 211 detects a face area and the orientation of a face from each of the captured images respectively captured at the predetermined time intervals. As the face detection method, any detection method using a face detection algorithm for detecting a face based on facial feature information, trained data (learned model) which were subjected to machine learning based on the facial feature information, a face detection library, or the like can be applied. Further, the predetermined time intervals can be intervals, for example, of 15 seconds, 10 seconds, or the like, but the predetermined time intervals can also be set to any other time intervals. Note that when the predetermined time intervals are the shortest time intervals, the face is detected for every consecutive frame. The face detection processing unit 211 detects a face area and the orientation of a face from each of the captured images, and outputs coordinate information on the detected face area, face angle information corresponding to the orientation of the face, and the like.

The HPD processing unit 212 determines whether or not the user is present in front of the information processing apparatus 1 based on whether or not the face area is detected from the captured image by the face detection processing unit 211. For example, when the face area is detected from the captured image by the face detection processing unit 211, the HPD processing unit 212 determines that the user is present in front of the information processing apparatus 1. On the other hand, when no face area is detected from the captured image by the face detection processing unit 211, the HPD processing unit 212 determines that the user is not present in front of the information processing apparatus 1. Then, the HPD processing unit 212 outputs HPD information based on the determination result of whether or not the user is present in front of the information processing apparatus 1.

For example, when determining that the user is present in front of the information processing apparatus 1, the HPD processing unit 212 outputs HPD information indicating that the HPD determination result is true (hereinafter called presence information). Further, when determining that the user is not present in front of the information processing apparatus 1, the HPD processing unit 212 outputs HPD information indicating that the HPD determination result is false (hereinafter called absence information). In other words, the HPD processing unit 212 outputs, to the HPD control processing unit 220, the presence information or the absence information based on the detection result of the face area by the face detection processing unit 211. Further, when outputting the presence information, the HPD processing unit 212 outputs face angle information corresponding to the orientation of the face of the user.

The HPD control processing unit 220 executes HPD control processing to instruct the control of the operating state of the system based on the posture (orientation) of the information processing apparatus 1 and the result of the HPD processing by the face detection unit 210. For example, the HPD control processing unit 220 includes a posture determination unit 221, an operating state determination unit 222, and an HPD information output unit 223.

The posture determination unit 221 detects the posture of the information processing apparatus 1 (for example, the orientations of the first chassis 101 and the second chassis 102) based on the output of the sensor 180. For example, the posture determination unit 221 detects the rotation angle β as the posture of the information processing apparatus 1, and determines whether or not the posture of the information processing apparatus 1 is landscape based on whether or not the detected rotation angle β is in a predetermined angle range (see FIG. 8). Further, the posture determination unit 221 detects the hinge angle θ as the posture of the information processing apparatus 1, and determines the open/closed state of the information processing apparatus 1 and whether or not the information processing apparatus 1 is in the bent state based on the detected hinge angle θ. For example, when determining that the posture of the information processing apparatus 1 is landscape, the posture determination unit 221 further determines whether or not the information processing apparatus 1 is in the book mode based on the detected hinge angle θ (see FIG. 9). Specifically, when determining that the posture of the information processing apparatus 1 is landscape, the posture determination unit 221 determines whether or not the hinge angle θ is less than a predetermined angle (for example, hinge angle θ<160°), and when determining that the hinge angle θ is less than the predetermined angle, the posture determination unit 221 determines that the information processing apparatus 1 is in the book mode.

The operating state determination unit 222 determines the operating state of the system to be controlled by the main processing unit 330. For example, the operating state determination unit 222 determines whether the current operating state of the system is the normal operating state or the standby state.

The HPD information output unit 223 determines whether or not to support the HPD processing. When determining to support the HPD processing, the HPD information output unit 223 instructs the control of the operating state of the system based on the results of the HPD processing. Whether or not to support the HPD processing may be set, for example, by the user, or may be set according to the usage form of the information processing apparatus 1 or the operating state of the system.

For example, when determining to support the HPD processing, the HPD information output unit 223 outputs, to the operation control unit 320, HPD control information to instruct the control of the operating state of the system based on the posture (orientation) of the information processing apparatus 1 detected by the posture determination unit 221, the operating state of the system determined by the operating state determination unit 222, and the results (the face area and the orientation of the face) of the HPD processing by the face detection unit 210. On the other hand, when determining not to support the HPD processing, the HPD information output unit 223 does not output HPD control information to instruct the control of the operating state of the system based on the HPD processing.

A case of supporting the HPD processing will be described below. Here, a configuration for controlling between the normal operating state and the low power state described with reference to FIG. 10 will be described. When acquiring the presence information and the face angle information from the face detection unit 210, the HPD information output unit 223 selects, based on the face angle information, either HPD control information to instruct the control of the operating state of the system to the normal operating state (hereinafter called "attention information") or HPD control information to instruct the transition of the operating state of the system to the low power state (hereinafter called "no-attention information"), and outputs the selected HPD control information to the operation control unit 320.

For example, in usage forms (portrait, clamshell, and the like) other than landscape, the HPD information output unit 223 selects and outputs either the attention information or the no-attention information based on the face angle information (the orientation of the face). For example, in usage forms other than landscape, the HPD information output unit 223 selects the first control mode, and outputs the attention information in a first direction range (a range determined to be face angle α=0°) in which the face angle information (the orientation of the face) is determined to indicate the front direction (in a range determined to be face angle α=0°), or outputs the no-attention information when the first direction range is changed to any direction range other than the first direction range.

Further, in the case of landscape, the HPD information output unit 223 selects and outputs either the attention information or the no-attention information based on the face angle information (the orientation of the face) and the hinge angle θ. For example, when the usage form is landscape and in the book mode, the HPD information output unit 223 selects the second control mode, and outputs the attention information in a second direction range (for example, in a range determined to be face angle α=0° or) 45° in which the face angle information (the orientation of the face) is wider than that in the above first direction range, or outputs the no-attention information when the second direction range is changed to any direction range other than the second direction range.

Note that when the usage form is not in the book mode even in the case of landscape, the operation of the HPD information output unit 223 is the same as the usage forms other than landscape. In other words, when the usage form is in any mode other than the book mode, the HPD information output unit 223 selects the first control mode, while in the book mode, the HPD information output unit 223 selects the second control mode.

The operation control unit 320 switches the operating state of the system. For example, the operation control unit 320 executes boot processing to cause the system to make the transition from the standby state to the normal operating state, sleep processing to cause the system to make the transition from the normal operating state to the standby state, and the like. Further, the operation control unit 320 controls the operating state of the system to the normal operating state or the low power state based on the HPD control information output from the HPD information output unit 223.

For example, when acquiring the no-attention information output from the HPD information output unit 223 in the normal operating state, the operation control unit 320 makes the transition from the normal operating state to the low power state. Further, when acquiring the attention information from the HPD information output unit 223 in the low power state, the operation control unit 320 makes the transition from the low power state to the normal operating state. Note that the operation control unit 320 continues the normal operating state while acquiring the attention information output from the HPD information output unit 223 in the normal operating state.

[Operation of HPD Control Processing According to Face Orientation]

Figure 13:
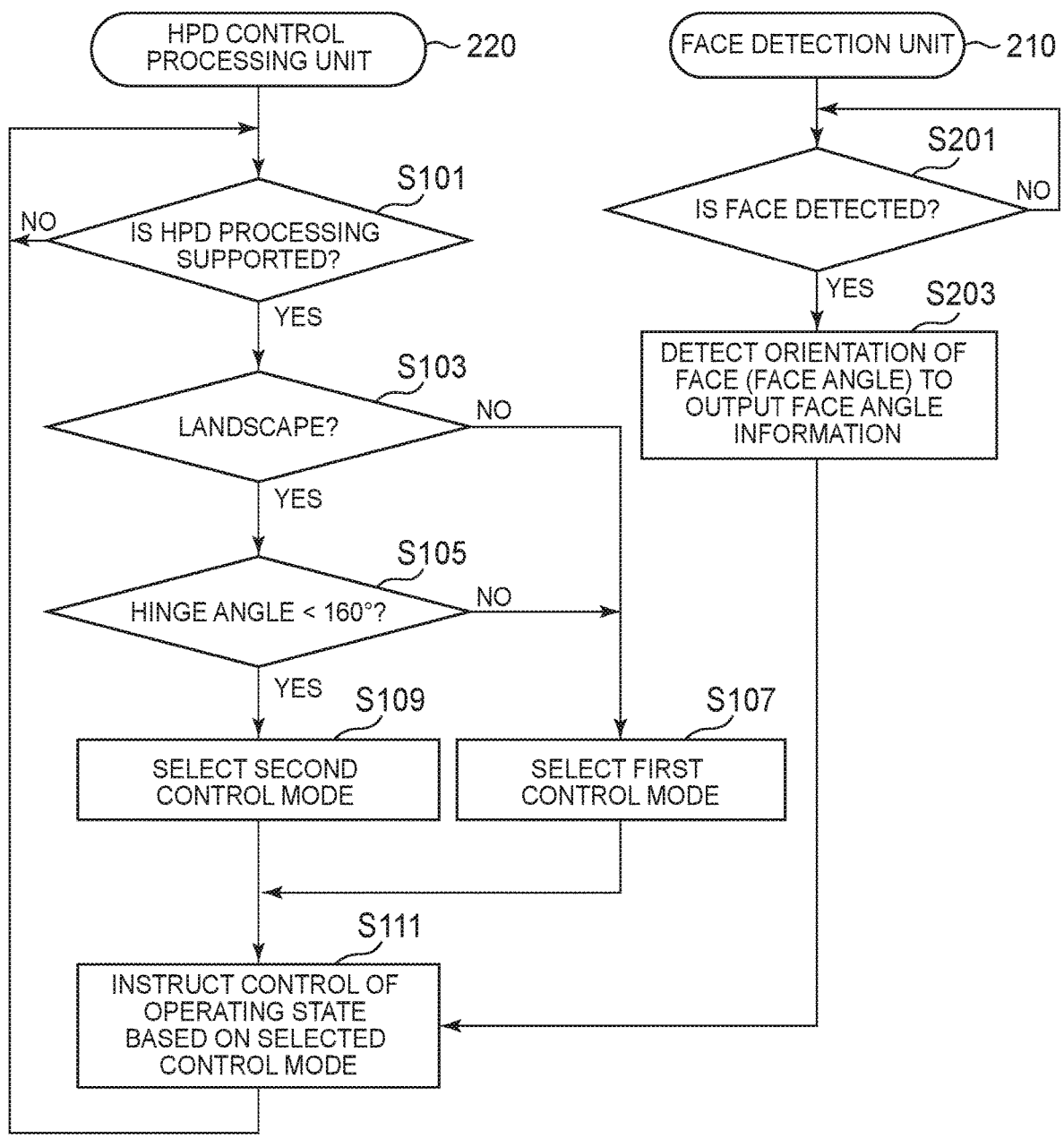
FIG. 13 is a flowchart illustrating an example of HPD control processing in a normal operating state according to the first embodiment.

Referring next to FIG. 13, the operation of HPD control processing in which the information processing apparatus 1 switches between a face detection enabled mode and a face detection disabled mode in the normal operating state to output HPD control information will be described.

FIG. 13 is a flowchart illustrating an example of HPD control processing in the normal operating state according to the present embodiment.

(Step S101) The HPD control processing unit 220 determines whether or not to support the HPD processing. When determining to support the HPD processing (YES), the HPD control processing unit 220 proceeds to a process in step S103. On the other hand, when determining not to support the HPD processing (NO), the HPD control processing unit 220 continues the process in step S101.

(Step S103) Based on the output of the sensor 180, the HPD control processing unit 220 determines whether or not the usage form is landscape based on whether or not the rotation angle β is in the predetermined angle range (see FIG. 8). When determining that the usage form is landscape (YES), the HPD control processing unit 220 proceeds to a process in step S105. On the other hand, when determining that the usage form is not landscape (NO), since it is in any mode other than the book mode, the HPD control processing unit 220 proceeds to a process in step S107.

(Step S105) Based on the output of the sensor 180, the HPD control processing unit 220 determines whether or not the hinge angle θ is less than the predetermined angle (for example, hinge angle θ<160°). When determining that the hinge angle θ is less than the predetermined angle, the HPD control processing unit 220 determines that the mode is the book mode, and proceeds to a process in step S109. On the other hand, when determining that the hinge angle θ is not less than the predetermined angle, since the mode is any mode other than the book mode, the HPD control processing unit 220 proceeds to the process in step S107.

(Step S107) The HPD control processing unit 220 sets the control mode to the first control mode (see FIG. 10), and proceeds to a process in step S111.

(Step S109) The HPD control processing unit 220 sets the control mode to the second control mode (see FIG. 10), and proceeds to the process in step S111.

(Step S201) The face detection unit 210 detects a face area from each of captured images respectively captured by the imaging unit 120 at the predetermined time intervals, and determines whether or not the face area is detected. When determining that the face area is not detected (NO), the face detection unit 210 continues the process in step S201. On the other hand, when determining that the face area is detected (YES), the face detection unit 210 proceeds to a process in step S203.

(Step S203) The face detection unit 210 detects the orientation of a face in the detected face area, and outputs, to the HPD control processing unit 220, face angle information (face angle α) corresponding to the orientation of the face.

(Step S111) In the control mode selected in step S107 or step S109, the HPD control processing unit 220 outputs, to the operation control unit 320, the HPD control information (the attention information or the no-attention information) according to the face angle information output from the face detection unit 210 to instruct the control of the operating state of the system. Thus, the operation control unit 320 controls the operating state of the system to the normal operating state or the low power state based on the HPD control information (the attention information or the no-attention information). Then, the procedure returns to the process in step S101.

Summary of First Embodiment

As described above, the information processing apparatus 1 according to the present embodiment includes: the first chassis 101; the second chassis 102; and the hinge mechanism 103 which couples the first chassis 101 and the second chassis 102 together to be bendable in a direction, in which the inner surface (first surface) of the first chassis 101 and the inner surface (second surface) of the second chassis 102 face each other, from the open state in which the inner surface of the first chassis 101 and the inner surface of the second chassis 102 are open. Further, the information processing apparatus 1 includes: the sensor 180 for detecting orientations of the first chassis 101 and the second chassis 102; the imaging unit 120 provided on either one of the inner surface of the first chassis 101 and the inner surface of the second chassis 102 to image a direction to face the surface on which the imaging unit 120 is provided; the system memory 304 (an example of a memory) which temporarily stores a program of an OS (an example of a system); the CPU 301 (an example of a first processor); the face detection unit 210 (an example of a second processor); and the chipset 303 (an example of a third processor). The CPU 301 executes the program of the OS stored in the system memory 304 to control the operation of the system. The face detection unit 210 detects a face area with a face captured therein and the orientation of the face from an image captured by the imaging unit 120. The chipset 303 detects orientations of the first chassis 101 and the second chassis 102 using the sensor 180 to instruct control of the operating state of the system to be controlled by the CPU 301 based on the detected orientations of the first chassis 101 and the second chassis 102, and the orientation of the face captured in the face area detected by the face detection unit 210.

Thus, when controlling the operating state of the system based on the orientation of the face of the user using face detection, since the information processing apparatus 1 performs control based on the orientations of the first chassis 101 and the second chassis 102 in addition to the orientation of the face, control to an unintended operating state can be prevented.

For example, the chipset 303 detects, as the orientations of the first chassis 101 and the second chassis 102, the rotation angle $\beta$ in a direction of rotation about an axis orthogonal to the inner surface of the first chassis 101 or the inner surface of the second chassis 102 (for example, the display surface of the display 110), and the hinge angle $\theta$ between the first chassis 101 and the second chassis 102 by the hinge mechanism 103, and when the rotation angle $\beta$ is in a predetermined angle range (for example, in the case of landscape), the chipset 303 instructs control of the operating state of the system to be controlled by the CPU 301 based on the orientation of the face captured in the face area detected by the face detection unit 210 and the hinge angle $\theta$.

Thus, for example, in the case of use in landscape, when controlling the operating state of the system based on the orientation of the face of the user using face detection, since the information processing apparatus 1 performs control based on the hinge angle $\theta$ between the first chassis 101 and the second chassis 102 in addition to the orientation of the face, control to an unintended operating state in the book mode can be prevented.

Further, when the rotation angle $\beta$ is in any angle range other than the predetermined angle range (for example, in any angle range other than landscape), the chipset 303 instructs the control of the operating state of the system to be controlled by the CPU 301 based on the orientation of the face captured in the face area detected by the face detection unit 210.

Thus, in any mode other than the book mode, when controlling the operating state of the system based on the orientation of the face of the user using face detection, the information processing apparatus 1 can perform control properly based on the orientation of the face.

Specifically, for example, in the case where the rotation angle $\beta$ is in any angle range other than the predetermined angle range (for example, in any angle range other than landscape), when the orientation of the face captured in the face area detected by the face detection unit 210 is changed from the first direction range determined to be the front direction (from the range determined to be face angle $\alpha=0°$) to any direction range other than the first direction range, the chipset 303 instructs the operating state of the system to make the transition to the low power state (the operating state with reduced power consumption). On the other hand, in a case where the rotation angle $\beta$ is in the predetermined angle range and the hinge angle $\theta$ is less than a predetermined angle (for example, hinge angle $\theta<160°$) (for example, in the case of the book mode), when the orientation of the face captured in the face area detected by the face detection unit 210 is changed from the second direction range (for example, a range determined to be face angle $\alpha=0°$ or 45°) wider than the above first direction range to any direction range other than the second direction range, the chipset 303 instructs the operating state of the system to make the transition to the low power state.

Thus, when controlling the operating state of the system based on the orientation of the face of the user using face detection in the book mode, since the information processing apparatus 1 sets the range, in which the orientation of the face is determined to be the front direction, wider than any range other than that in the book mode, an unintended transition to the low power state despite the fact that the user is facing forward can be prevented.

Here, the case where the rotation angle $\beta$ is in the predetermined angle range includes a state where the first chassis 101 and the second chassis 102 are located in the horizontal direction across the hinge mechanism 103 (that is, landscape).

Thus, for example, in the case of use in landscape, when controlling the operating state of the system based on the orientation of the face of the user using face detection, since the information processing apparatus 1 performs control based on the hinge angle $\theta$ between the first chassis 101 and the second chassis 102 in addition to the orientation of the face, control to an unintended operating state by the hinge angle $\theta$ (for example, in the case of the book mode) can be prevented.

The information processing apparatus 1 further includes the display 110 provided from the inner surface of the first chassis 101 to the inner surface of the second chassis 102 to be bendable according to bending by the hinge mechanism 103.

Thus, although the information processing apparatus 1 equipped with one flexible display from the inner surface of the first chassis 101 to the inner surface of the second chassis 102 is expected to be used in various usage forms, control to an unintended operating state depending on the usage form can be prevented when the information processing apparatus 1 controls the operating state of the system based on the orientation of the face of the user using face detection.

Further, a control method for the information processing apparatus 1 according to the present embodiment includes: a step of causing the CPU 301 to control the operation of the system by executing the OS program stored in the system memory 304; a step of causing the face detection unit 210 to detect a face area with a face captured therein and an orientation of the face from an image captured by the imaging unit 120; and a step of causing the chipset 303 to detect orientations of the first chassis 101 and the second chassis 102 using the sensor 180 and to instruct control of the operating state of the system to be controlled by the CPU 301 based on the detected orientations of the first chassis 101 and the second chassis 102, and the orientation of the face captured in the face area detected by the face detection unit 210.

Thus, when controlling the operating state of the system based on the orientation of the face of the user using face detection, since the information processing apparatus 1 performs control based on the orientations of the first chassis 101 and the second chassis 102 in addition to the orientation of the face, control to an unintended operating state can be prevented.

Second Embodiment

Next, a second embodiment of the present invention will be described.

Since the basic configurations of the information processing apparatus 1 according to this embodiment are the same as the configurations illustrated in FIG. 1, FIG. 11, and FIG. 12, the description thereof will be omitted. In the present embodiment, part of processing by the face detection unit 210 and the HPD control processing unit 220 is different from that in the first embodiment.

In the first embodiment, the face detection unit 210 detects the orientation of the face (face angle α) in stages (for example, in three stages of "0°," "45°," and "75°"), but the orientation of the face (face angle α) may also be detected linearly at finer angles. Further, in the first embodiment, the HPD control processing unit 220 selects either one of the preset first control mode and second control mode depending on whether or not the mode is the book mode to change the instruction to control the operating state of the system for the orientation of the face (face angle α). In contrast, the HPD control processing unit 220 in the present embodiment corrects, based on the hinge angle θ, face angle information corresponding to the orientation of the face (face angle α) detected by the face detection unit 210 to instruct control of the operating state of the system based on the corrected face angle information.

For example, when correcting the face angle information based on the hinge angle θ, the HPD control processing unit 220 determines an offset angle value to be corrected according to the hinge angle θ. The HPD control processing unit 220 determines the offset angle value to 0 when the face angle information is not corrected based on the hinge angle θ.

Figure 14:
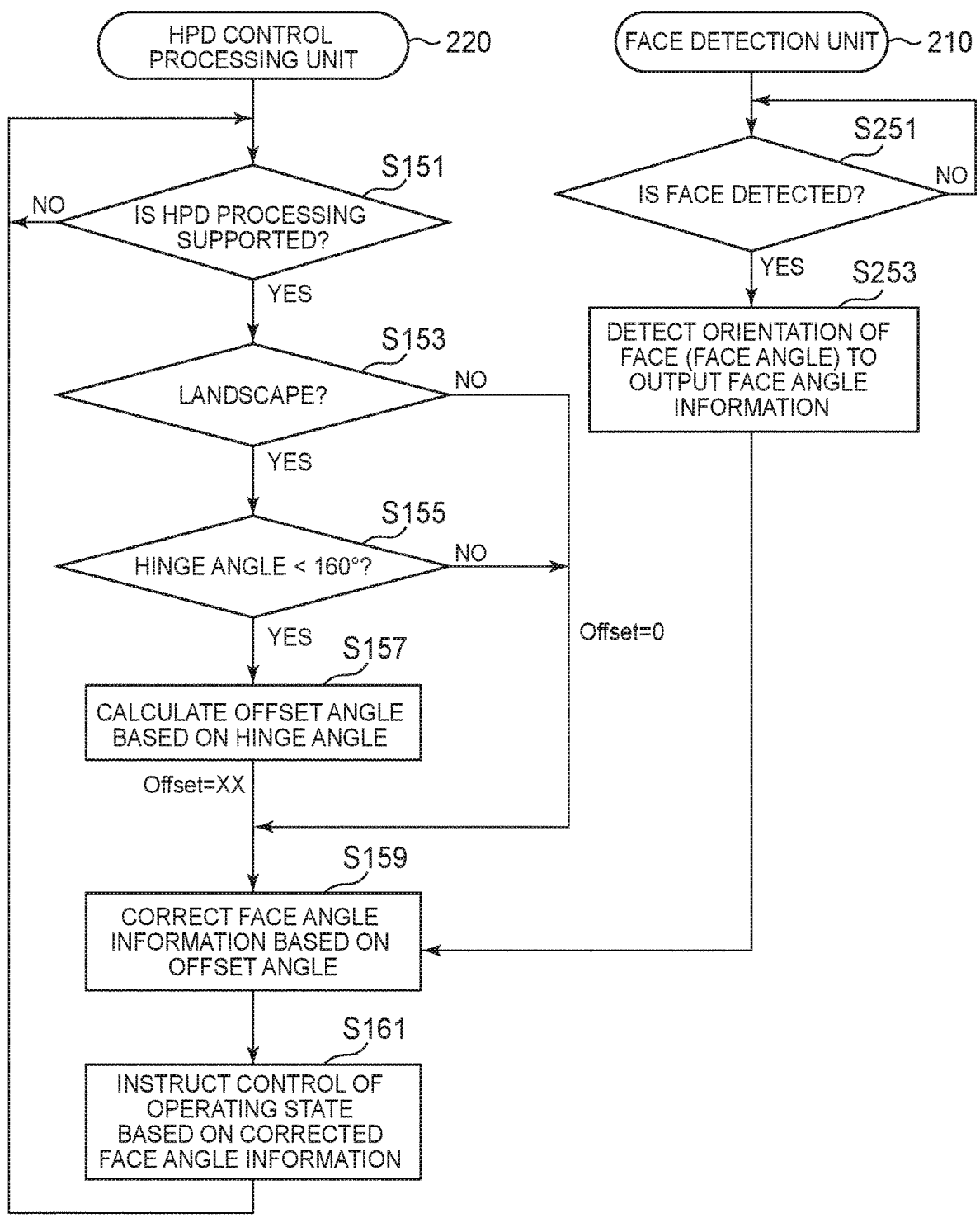
FIG. 14 is a flowchart illustrating an example of HPD control processing in the normal operating state according to a second embodiment.

FIG. 14 is a flowchart illustrating an example of HPD control processing in the normal operating state according to the present embodiment.

(Step S151) The HPD control processing unit 220 determines whether or not to support the HPD processing. When determining to support the HPD processing (YES), the HPD control processing unit 220 proceeds to a process in step S153. On the other hand, when determining not to support the HPD processing (NO), the HPD control processing unit 220 continues the process in step S151.

(Step S153) Based on the output of the sensor 180, the HPD control processing unit 220 determines whether or not the usage form is landscape based on whether or not the rotation angle β is in the predetermined angle range (see FIG. 8). When determining that the usage form is landscape (YES), the HPD control processing unit 220 proceeds to a process in step S155. On the other hand, when determining that the usage form is not landscape (NO), since it is any mode other than the book mode, the HPD control processing unit 220 determines the offset angle value to "0°" and proceeds to a process in step S159.

(Step S155) Based on the output of the sensor 180, the HPD control processing unit 220 determines whether or not the hinge angle θ is less than the predetermined angle (for example, hinge angle θ<160°). When determining that the hinge angle θ is less than the predetermined angle, the HPD control processing unit 220 determines that the mode is the book mode, and proceeds to a process in step S157. On the other hand, when determining that the hinge angle θ is not less than the predetermined angle, since the mode is any mode other than the book mode, the HPD control processing unit 220 determines the offset angle value to "0°" and proceeds to the process in step S159.

(Step S157) Based on the hinge angle θ, the HPD control processing unit 220 calculates and determines the offset angle value. Then, the HPD control processing unit 220 proceeds to the process in step S159.

(Step S251) The face detection unit 210 detects a face area from each of captured images captured by the imaging unit 120 respectively at the predetermined time intervals to determine whether or not a face area is detected. When determining that no face area is detected (NO), the face detection unit 210 continues the process in step S251. On the other hand, when determining that a face area is detected (YES), the face detection unit 210 proceeds to a process in step S253.

(Step S253) The face detection unit 210 detects the orientation of the face in the detected face area, and outputs, to the HPD control processing unit 220, face angle information (face angle α) corresponding to the orientation of the face.

(Step S159) Based on the offset angle value "0°" determined in step S153 or step S155 or the offset angle value calculated in step S157, the HPD control processing unit 220 corrects the face angle information output from the face detection unit 210. Then, the HPD control processing unit 220 proceeds to a process in step S161.

(Step S161) Based on the face angle information corrected in step S159, the HPD control processing unit 220 outputs, to the operation control unit 320, HPD control information (attention information or no-attention information) to instruct control of the operating state of the system. Thus, the operation control unit 320 controls the operating state of the system to the normal operating state or the low power state based on the HPD control information (attention information or no-attention information). Then, the procedure returns to the process in step S101.

Summary of Second Embodiment

As described above, in the information processing apparatus 1 according to the present embodiment, the chipset 303 detects the orientations of the first chassis 101 and the second chassis 102 using the sensor 180, and corrects face angle information (an example of angle information) corresponding to the orientation of the face captured in the face area detected by the face detection unit 210 based on the detected orientations of the first chassis 101 and the second chassis 102.

Thus, when controlling the operating state of the system based on the orientation of the face of the user using face detection, since the information processing apparatus 1 corrects and controls the detected orientation of the face based on the orientations of the first chassis 101 and the second chassis 102, control to an unintended operating state can be prevented.

For example, as the orientations of the first chassis 101 and the second chassis 102, the chipset 303 detects the rotation angle β in a direction of rotation about an axis orthogonal to the inner surface of the first chassis 101 or the inner surface of the second chassis 102 (for example, the display surface of the display 110), and the hinge angle θ between the first chassis 101 and the second chassis 102 by the hinge mechanism 103, and when the rotation angle β is in the predetermined angle range (for example, in the case of landscape), the chipset 303 corrects, based on the hinge angle θ, face angle information corresponding to the orientation of the face captured in the face area detected by the face detection unit 210.

Thus, for example, in the case of use in landscape, when controlling the operating state of the system based on the orientation of the face of the user using face detection, since the information processing apparatus 1 corrects and controls the detected orientation of the face based on the hinge angle θ between the first chassis 101 and the second chassis 102, control to an unintended operating state in the book mode can be prevented.

Specifically, for example, when the rotation angle β is in any angle range other than the predetermined angle range (for example, in any angle range other than landscape), the chipset 303 instructs control of the operating state of the system to be controlled by the CPU 301 based on face angle information corresponding to the orientation of the face captured in the face area detected by the face detection unit 210. On the other hand, when the rotation angle β is in the predetermined angle range and the hinge angle θ is less than the predetermined angle (for example, hinge angle θ<160°) (for example, in the case of the book mode), the chipset 303 corrects, based on the hinge angle θ, face angle information corresponding to the orientation of the face captured in the face area detected by the face detection unit 210. Then, based on the corrected face angle information, the chipset 303 instructs control of the operating state of the system to be controlled by the CPU 301.

Thus, when controlling the operating state of the system based on the orientation of the face of the user using face detection in the book mode, since the information processing apparatus 1 corrects and controls the detected orientation of the face based on the hinge angle θ between the first chassis 101 and the second chassis 102, an unintended transition to the low power state despite the fact that the user is facing forward can be prevented.

Further, a control method for the information processing apparatus 1 according to the present embodiment includes: a step of causing the CPU 301 to control the operation of the system by executing the OS program stored in the system memory 304; a step of causing the face detection unit 210 to detect a face area with a face captured therein and an orientation of the face from an image captured by the imaging unit 120; a step of causing the chipset 303 to detect orientations of the first chassis 101 and the second chassis 102 using the sensor 180 and to correct face angle information corresponding to the orientation of the face captured in the face area detected by the face detection unit 210 based on the detected orientations of the first chassis 101 and the second chassis 102; and a step of causing the chipset 303 to instruct control of the operating state of the system to be controlled by the CPU 301 based on the corrected face angle information.

Thus, when controlling the operating state of the system based on the orientation of the face of the user using face detection, since the information processing apparatus 1 corrects and controls the detected orientation of the face based on the orientations of the first chassis 101 and the second chassis 102, control to an unintended operating state can be prevented.

While the embodiments of this invention have been described in detail above with reference to the accompanying drawings, the specific configurations are not limited to the above-described embodiments, and design changes are included without departing from the scope of this invention. For example, the respective configurations in the respective embodiments described above can be combined arbitrarily.

Further, in the aforementioned embodiments, the example of the information processing apparatus 1 equipped with one foldable display 110 (flexible display) provided from the inner surface of the first chassis 101 to the inner surface of the second chassis 102 is described, but the information processing apparatus 1 may also be configured to include separate displays (not foldable displays) on the inner surface of the first chassis 101 and the inner surface of the second chassis 102, respectively. In other words, the display modes may be a one-screen mode to control the display as a screen area obtained by putting respective screen areas of the two displays together into one, and a two-screen mode to individually control the displays as respective screen areas of the two displays. Further, processing in each of the embodiments described above may be applied as a half-screen mode to control only the screen area of either one of the two displays to be targeted for the display and the other screen area to black display or display off.

Further, in the aforementioned embodiments, the example in which the face detection unit 210 is provided separately from the EC 200 is given, but some or all of the functions of the face detection unit 210 may be provided by the EC 200, or some or all of the functions of the face detection unit 210 and the EC 200 may be configured as one package. Further, some or all of the functions of the face detection unit 210 may be provided by the main processing unit 300, or some or all of the functions of the face detection unit 210 and some or all of the functions of the main processing unit 300 may be configured as one package. Further, some or all of the functions of the HPD control processing unit 220 may be configured as a functional component of a processing unit (for example, the EC 200) other than the chipset 303.

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program (s) already recorded in the computer system.

Further, some or all of the functions of the information processing apparatus 1 in the above-described embodiments may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

DESCRIPTION OF SYMBOLS 1 information processing apparatus
101 first chassis
102 second chassis
103 hinge mechanism
110 display
115 touch panel
120 imaging unit
140 power button
160 communication unit
170 storage unit
180 sensor
200 EC
210 face detection unit
211 face detection processing unit
212 HPD processing unit
220 HPD control processing unit
221 posture determination unit
222 operating state determination unit
223 HPD information output unit
300 main processing unit
301 CPU
302 GPU
303 chipset
304 system memory
320 operation control unit
400 power supply unit

What is claimed is:

1. An information processing apparatus comprising:
a first chassis;
a second chassis;
a hinge mechanism which couples the first chassis and the second chassis together to be bendable in a direction to face a first surface of the first chassis and a second surface of the second chassis from a state in which the first surface and the second surface are open;
a sensor for detecting orientations of the first chassis and the second chassis;
an imaging unit provided on either one of the first surface and the second surface to image a direction to face the surface on which the imaging unit is provided;
a memory which temporarily stores a program of a system;
a first processor which controls an operating state of the system by executing the program;
a second processor which detects a face area with a face captured therein and an orientation of the face from an image captured by the imaging unit, where the orientation of the face is a rotation angle in a left-right direction relative to the information processing apparatus; and
a third processor which detects the orientations of the first chassis and the second chassis using the sensor to instruct control of the operating state of the system to be controlled by the first processor based on the detected orientations of the first chassis and the second chassis, and the orientation of the face captured in the face area detected by the second processor.

2. The information processing apparatus according to claim 1,
wherein the third processor detects, as the orientations of the first chassis and the second chassis,
a rotation angle in a direction of rotation about an axis orthogonal to the first surface or the second surface, and
a hinge angle between the first chassis and the second chassis by the hinge mechanism, and
when the rotation angle is in a predetermined angle range, the third processor instructs control of the operating state of the system to be controlled by the first processor based on the orientation of the face captured in the face area detected by the second processor, and the hinge angle.

3. The information processing apparatus according to claim 1, further comprising
a display provided from the first surface to the second surface to be bendable according to bending by the hinge mechanism.

4. The information processing apparatus according to claim 2,
wherein when the rotation angle is in any angle range other than the predetermined angle range, the third processor instructs the control of the operating state of the system to be controlled by the first processor based on the orientation of the face captured in the face area detected by the second processor.

5. The information processing apparatus according to claim 2, wherein
in a case where the rotation angle is in any angle range other than the predetermined angle range, when the orientation of the face captured in the face area detected by the second processor is changed from a first direction range determined to be a front direction to any direction range other than the first direction range, the third processor instructs the operating state of the system to make a transition to an operating state with reduced power consumption, and
in a case where the rotation angle is in the predetermined angle range and the hinge angle is less than a predetermined angle, when the orientation of the face captured in the face area detected by the second processor is changed from a second direction range wider than the first direction range to any direction range other than the second direction range, the third processor instructs the operating state of the system to make the transition to the operating state with reduced power consumption.

6. The information processing apparatus according to claim 2, wherein
when the rotation angle is in any angle range other than the predetermined angle range, the third processor instructs control of the operating state of the system to be controlled by the first processor based on angle information corresponding to the orientation of the face captured in the face area detected by the second processor, and
when the rotation angle is in the predetermined angle range and the hinge angle is less than a predetermined angle, the third processor corrects, based on the hinge angle, angle information corresponding to the orientation of the face captured in the face area detected by the second processor, and based on the corrected angle information, the third processor instructs control of the operating state of the system to be controlled by the first processor.

7. The information processing apparatus according to claim 2,
wherein a case where the rotation angle is in the predetermined angle range includes a state where the first chassis and the second chassis are located in a horizontal direction across the hinge mechanism.

8. An information processing apparatus comprising:
a first chassis;
a second chassis;
a hinge mechanism which couples the first chassis and the second chassis together to be bendable in a direction to face a first surface of the first chassis and a second surface of the second chassis from a state in which the first surface and the second surface are open;
a sensor for detecting orientations of the first chassis and the second chassis;
an imaging unit provided on either one of the first surface and the second surface to image a direction to face the surface on which the imaging unit is provided;
a memory which temporarily stores a program of a system;
a first processor which controls an operating state of the system by executing the program;
a second processor which detects a face area with a face captured therein and an orientation of the face from an image captured by the imaging unit, where the orientation of the face is a rotation angle in a left-right direction relative to the information processing apparatus; and
a third processor which instructs control of the operating state of the system to be controlled by the first processor based on angle information corresponding to the orientation of the face captured in the face area detected by the second processor,
wherein the third processor detects the orientations of the first chassis and the second chassis using the sensor, and based on the detected orientations of the first chassis and the second chassis, the third processor corrects the angle information corresponding to the orientation of the face captured in the face area detected by the second processor.

9. The information processing apparatus according to claim 8,
wherein the third processor detects, as the orientations of the first chassis and the second chassis, a rotation angle in a direction of rotation about an axis orthogonal to the first surface or the second surface, and a hinge angle between the first chassis and the second chassis by the hinge mechanism, and
when the rotation angle is in a predetermined angle range, the third processor corrects, based on the hinge angle, angle information corresponding to the orientation of the face captured in the face area detected by the second processor.

10. A control method for an information processing apparatus including: a first chassis; a second chassis; a hinge mechanism which couples the first chassis and the second chassis together to be bendable in a direction to face a first surface of the first chassis and a second surface of the second chassis from a state in which the first surface and the second surface are open; a sensor for detecting orientations of the first chassis and the second chassis; an imaging unit provided on either one of the first surface and the second surface to image a direction to face the surface on which the imaging unit is provided; a memory which temporarily stores a program of a system; a first processor which controls an operating state of the system by executing the program; a second processor; and a third processor, the control method comprising:
a step of causing the second processor to detect a face area with a face captured therein and an orientation of the face from an image captured by the imaging unit, where the orientation of the face is a rotation angle in a left-right direction relative to the information processing apparatus;
a step of causing the third processor to detect the orientations of the first chassis and the second chassis using the sensor; and
a step of causing the third processor to instruct control of the operating state of the system to be controlled by the first processor based on the detected orientations of the first chassis and the second chassis, and the orientation of the face captured in the face area detected by the second processor.

11. A control method for an information processing apparatus including: a first chassis; a second chassis; a hinge mechanism which couples the first chassis and the second chassis together to be bendable in a direction to face a first surface of the first chassis and a second surface of the second chassis from a state in which the first surface and the second surface are open; a sensor for detecting orientations of the first chassis and the second chassis; an imaging unit provided on either one of the first surface and the second surface to image a direction to face the surface on which the imaging unit is provided; a memory which temporarily stores a program of a system; a first processor which controls an operating state of the system by executing the program; a second processor; and a third processor, the control method comprising:
a step of causing the second processor to detect a face area with a face captured therein and an orientation of the face from an image captured by the imaging unit, where the orientation of the face is a rotation angle in a left-right direction relative to the information processing apparatus;
a step of causing the third processor to detect the orientations of the first chassis and the second chassis using the sensor, and to correct, based on the detected orientations of the first chassis and the second chassis, angle information corresponding to the orientation of the face captured in the face area detected by the second processor; and
a step of causing the third processor to instruct control of the operating state of the system to be controlled by the first processor based on the corrected angle information.

* * * * *